United States Patent
Kim et al.

(10) Patent No.: US 12,192,875 B2
(45) Date of Patent: *Jan. 7, 2025

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

This patent is subject to a terminal disclaimer.

(21) Appl. No.: 17/910,692

(22) PCT Filed: Mar. 16, 2021

(86) PCT No.: PCT/KR2021/003221
§ 371 (c)(1),
(2) Date: Sep. 9, 2022

(87) PCT Pub. No.: WO2021/187858
PCT Pub. Date: Sep. 23, 2021

(65) Prior Publication Data
US 2023/0164661 A1     May 25, 2023

(30) Foreign Application Priority Data
Mar. 16, 2020 (KR) .......................... 10-2020-0032199

(51) Int. Cl.
*H04W 40/02* (2009.01)
*H04W 84/12* (2009.01)

(52) U.S. Cl.
CPC ............ *H04W 40/02* (2013.01); *H04W 84/12* (2013.01)

(58) Field of Classification Search
None
See application file for complete search history.

(56) References Cited

U.S. PATENT DOCUMENTS 11,882,512 B2 *   1/2024   Kim ..................... H04W 40/02
2019/0268956 A1 * 8/2019   Xiao .................... H04W 76/15
(Continued)

FOREIGN PATENT DOCUMENTS

KR    10-2018-0002670 A    1/2018
WO    2019/169101 A1       9/2019

OTHER PUBLICATIONS

Handte, et al. "Virtual Carrier Sense in Multi-Link," IEEE 802.11-20/0136r1, 16 pages, Feb. 2020.
(Continued)

*Primary Examiner* — Brian S Roberts
(74) *Attorney, Agent, or Firm* — BRYAN CAVE LEIGHTON PAISNER LLP

(57) ABSTRACT

According to various embodiments, a multi-link device (MLD) operating in a plurality of links can receive a PPDU through a first link from among the plurality of links. The PPU can include a first information field related to a second link that is differentiated from the first link. The first information field related to a second link can include a second information field related to a link identifier of a second link and a third information field related to whether all pieces of element information related to a second link is included in the PPDU.

17 Claims, 33 Drawing Sheets

(56) References Cited

U.S. PATENT DOCUMENTS

| | | | |
|---|---|---|---|
| 2019/0335454 A1 | 10/2019 | Huang et al. | |
| 2020/0221545 A1* | 7/2020 | Stacey | H04W 84/12 |
| 2020/0351988 A1* | 11/2020 | Chen | H04W 88/10 |
| 2021/0014911 A1* | 1/2021 | Patil | H04W 48/08 |

OTHER PUBLICATIONS

Huang, et al. "Multi-link Association Follow Up," IEEE 802.11-20/0030r4, 10 pages, Jan. 2020.

Alexander Min et al., "Multi-link power save operation", Intel Corporation, doc.: IEEE 802.11-19/1544r2, Jan. 13, 2020, pp. 1-18. See slides 3 and 9.

Insun Jang et al., "Indication of Multi-link Information", LG Electronics, doc.: IEEE 802.11-20/0028r0, Jan. 12, 2020, pp. 1-15. See slides 3-7 and 9.

Yonggang Fang et al., "Multi-link Power Saving Discussion", ZTE, doc.: IEEE 802.11-2020/0070, Jan. 11, 2020, pp. 1-14. See slides 2 and 6.

Jang et al. "Indication of Multi-link Information," IEEE 802.11-20/0028r1, 15 pages, Jan. 2020.

\* cited by examiner (a)

| L-LTF | L-STF | L-SIG | Data |

PPDU Format (IEEE 802.11a/g)

| L-LTF | L-STF | L-SIG | SIG A | HT-STF | HT-LTF | ... | HT-LTF | Data |

HT PPDU Format (IEEE 802.11n)

| L-LTF | L-STF | L-SIG | VHT-SIG A | VHT-STF | VHT-LTF | VHT-LTF | VHT-SIG B | Data |

VHT PPDU Format (IEEE 802.11ac)

| 8μs | 8μs | 4μs | 4μs | 8μs | 4μs | | | 4μs per symbol | | | |
|---|---|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

Variable Durationons per HE-LTF symbol

FIG. 16

| Multi-link STA ||||
|---|---|---|
| 5GHz | 6GHz ||
| STA 1 Link 1 | STA 2 Link 2 | STA 3 Link 3 |

TECHNIQUE FOR PERFORMING MULTI-LINK COMMUNICATION IN WIRELESS COMMUNICATION SYSTEM

This application is the National Phase of PCT International Application No. PCT/KR2021/003221, filed on Mar. 16, 2021, which claims the benefit of Korean Patent Application No. 10-2020-0032199, filed on Mar. 16, 2020, which are all hereby incorporated by reference herein in their entirety.

BACKGROUND

Field of the Disclosure

The present specification relates to a technique for performing multi-link communication in a wireless local area network (WLAN) system and, more particularly, to a method for transmitting information on a link in multi-link communication and an apparatus for supporting the same.

Related Art

Wireless network technologies may include various types of wireless local area networks (WLANs). The WLAN employs widely used networking protocols and can be used to interconnect nearby devices together. The various technical features described herein may be applied to any communication standard, such as Wi-Fi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In the EHT standard, a wide bandwidth (e.g., 160/320 MHz), 16 streams, and/or a multi-link (or multi-band) operation may be used to support high throughput and high data rate.

In the EHT standard, a device supporting a multi-link (i.e., a multi-link device) may operate in a plurality of links. The multi-link device needs to transmit element information on a second link through a first link. Accordingly, a technical feature for the multi-link device to receive information on a different link may be required.

According to various embodiments, a multi-link device (MLD) operating in a plurality of links may perform: an operation of receiving a physical layer protocol data unit (PPDU) through a first link among the plurality of links, the PPDU including a first information field related to a second link distinct from the first link among the plurality of links, and the first information field related to the second link including a second information field related to a link identifier of the second link and a third information field related to whether complete element information for the second link is included in the PPDU; and an operation of obtaining the complete element information for the second link based on the second information field and the third information field.

A STA included in a multi-link device may also transmit information on another STA (or link) in the multi-link device through one link. Accordingly, it is possible to reduce overhead of a frame exchange. In addition, it is possible to increase link use efficiency of the STA and to reduce power consumption.

In addition, the multi-link device may receive a PPDU including element information on a second link through a first link. The PPDU may include an information field for indicating whether complete element information for the second link is included in the PPDU. Accordingly, the multi-link device may determine whether the complete element information for the second link is included in the received PPDU, and may obtain/identify the complete element information for the second link based thereon.

BRIEF DESCRIPTION OF THE DRAWINGS

FIG. 4 illustrates an example of a PPDU used in an IEEE standard.

FIG. 16 illustrates an example of the structure of a non-AP MLD.

DESCRIPTION OF EXEMPLARY EMBODIMENTS

Figure 1:
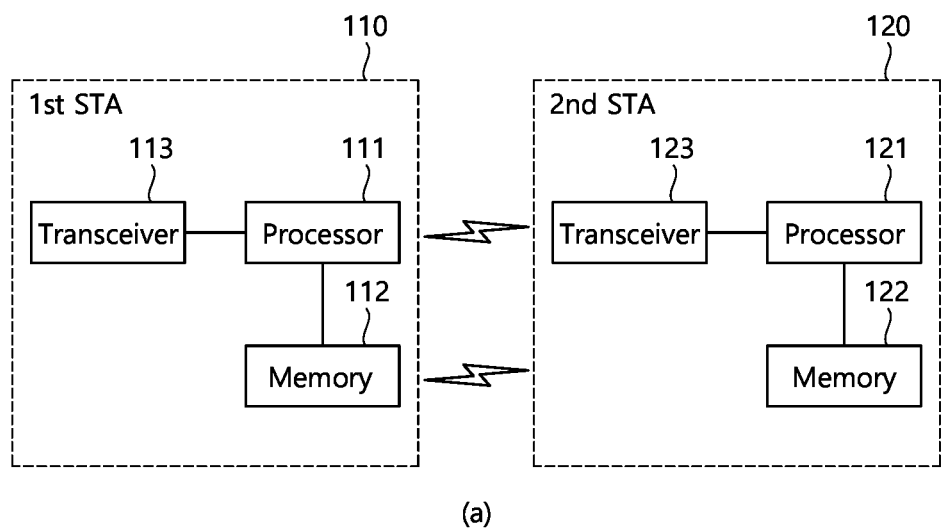
FIG. 1 shows an example of a transmitting apparatus and/or receiving apparatus of the present specification.
Figure 1:
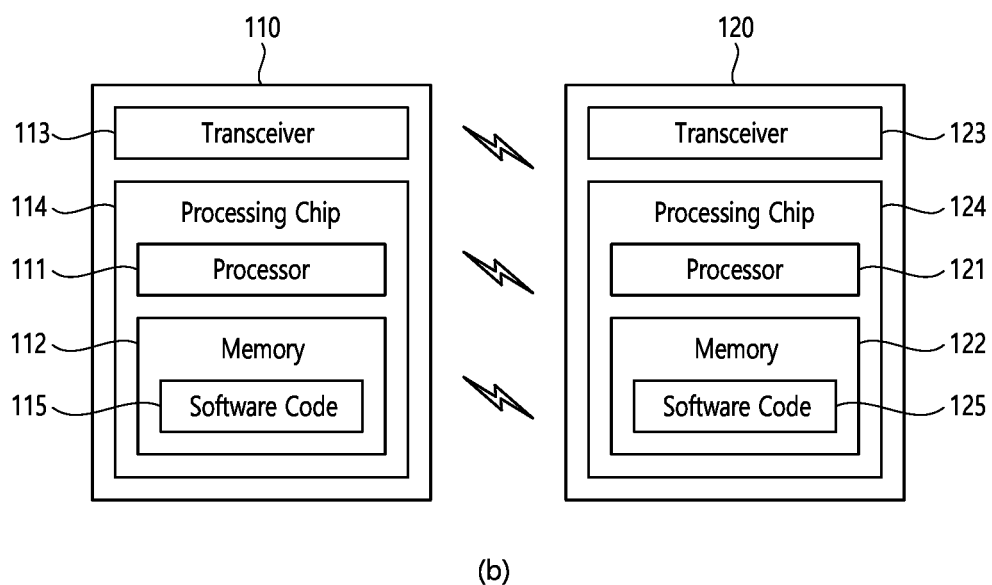

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specifica-
tion may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AN, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AN, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
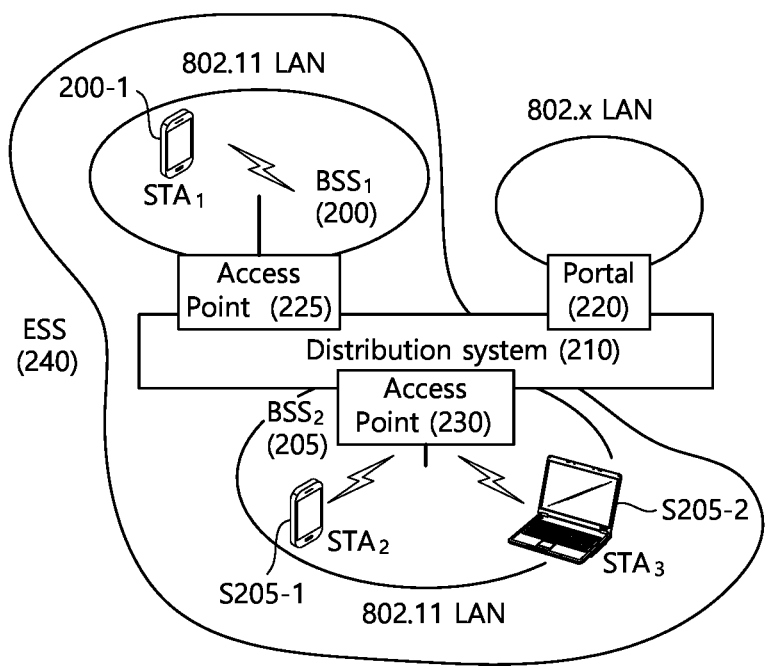
FIG. 2 is a conceptual view illustrating the structure of a wireless local area network (WLAN).
Figure 2:
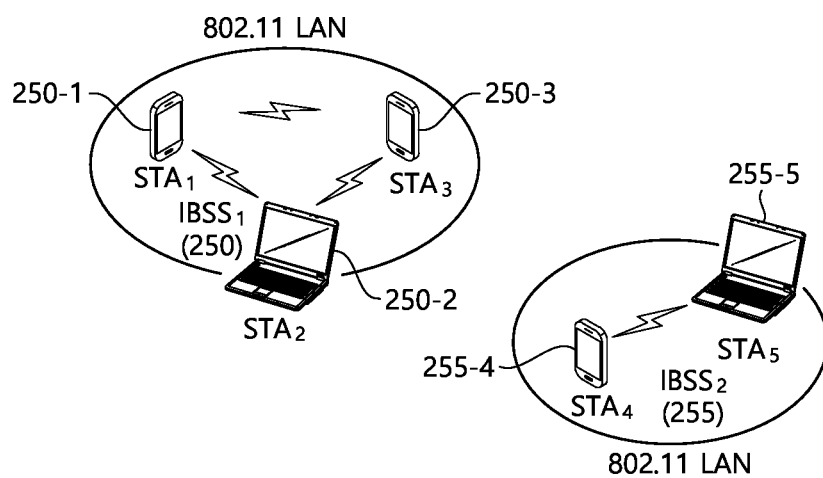

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
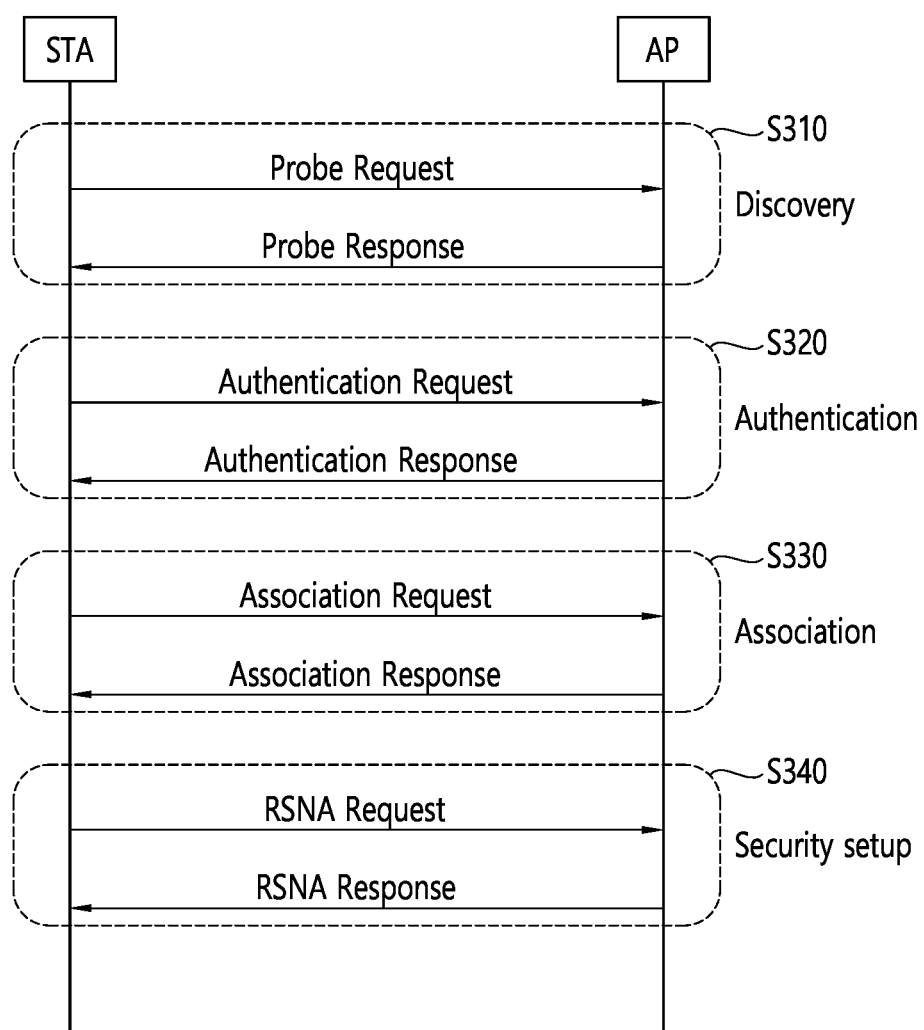
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinct from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
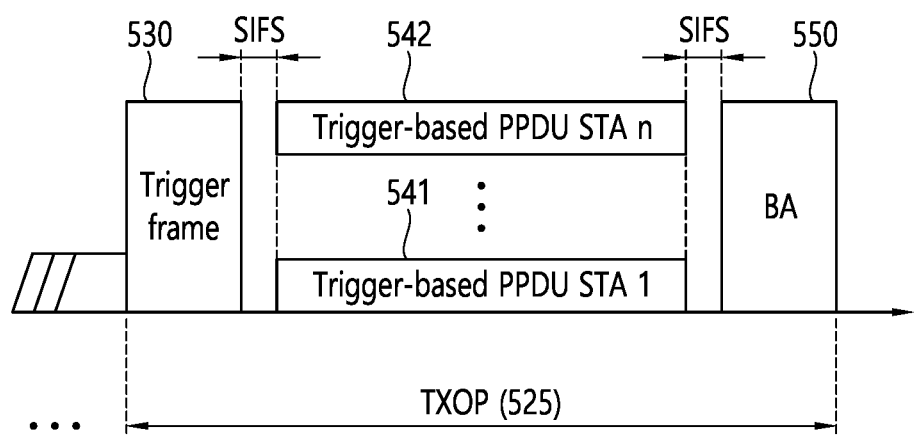
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 530. That is, the transmitting STA may transmit a PPDU including the trigger frame 530. Upon receiving the PPDU including the trigger frame, a trigger-based (TB) PPDU is transmitted after a delay corresponding to SIFS.

TB PPDUs 541 and 542 may be transmitted at the same time period, and may be transmitted from a plurality of STAs (e.g., user STAs) having AIDs indicated in the trigger frame 530. An ACK frame 550 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
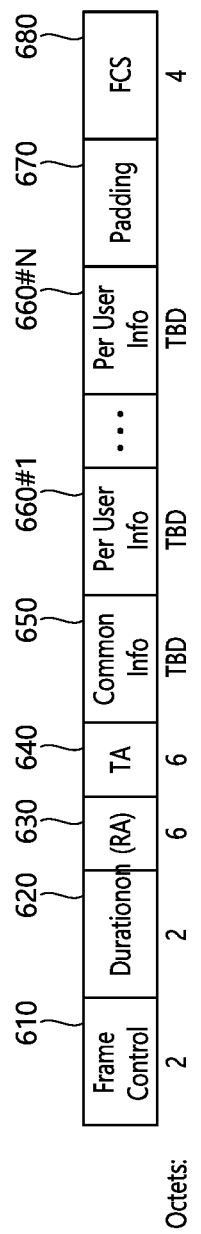
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 610 of FIG. 6 may include information related to a MAC protocol version and extra additional control information. A duration field 620 may include time information for NAV configuration or information related to an identifier (e.g., AID) of a STA.

In addition, an RA field 630 may include address information of a receiving STA of a corresponding trigger frame, and may be optionally omitted. A TA field 640 may include address information of a STA (e.g., an AP) which transmits the corresponding trigger frame. A common information field 650 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 660 #1 to 660 #N corresponding to the number of receiving STAs which receive the trigger frame of FIG. 6 are preferably included. The per user information field may also be called an "allocation field".

In addition, the trigger frame of FIG. 6 may include a padding field 670 and a frame check sequence field 680.

Each of the per user information fields 660 #1 to 660 #N shown in FIG. 6 may include a plurality of subfields.

Figure 7:
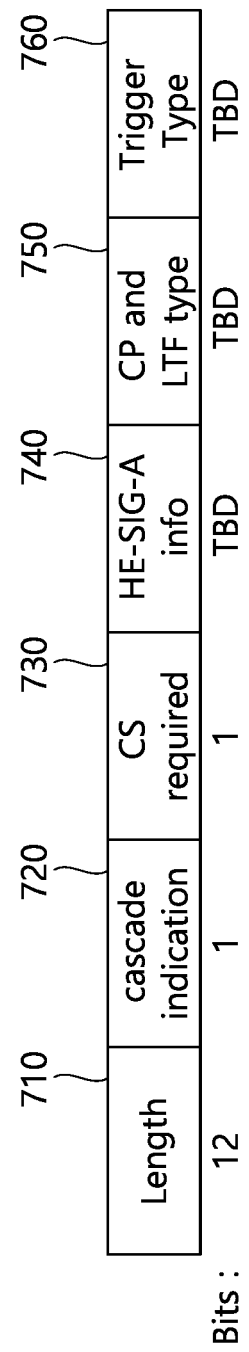
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 710 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 710 of the trigger frame may be used to indicate the length of the corresponding uplink PPDU.

In addition, a cascade identifier field 720 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 730 indicates whether a wireless medium state or a NAV or the like is necessarily considered in a situation where a receiving device which has received a corresponding trigger frame transmits a corresponding uplink PPDU.

An HE-SIG-A information field 740 may include information for controlling content of a SIG-A field (i.e., HE-SIG-A field) of the uplink PPDU in response to the corresponding trigger frame.

A CP and LTF type field 750 may include information related to a CP length and LTF length of the uplink PPDU transmitted in response to the corresponding trigger frame. A trigger type field 760 may indicate a purpose of using the corresponding trigger frame, for example, typical triggering, triggering for beamforming, a request for block ACK/NACK, or the like.

It may be assumed that the trigger type field 760 of the trigger frame in the present specification indicates a trigger frame of a basic type for typical triggering. For example, the trigger frame of the basic type may be referred to as a basic trigger frame.

Figure 8:
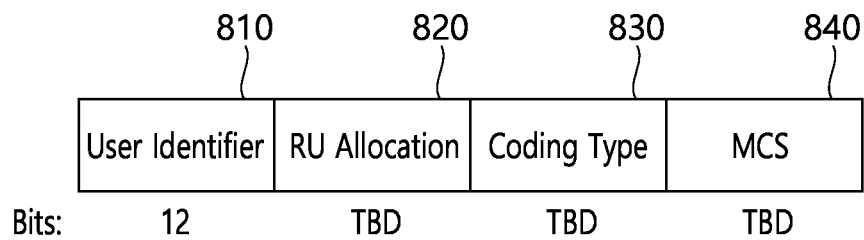
FIG. 8 illustrates an example of a subfield included in a per user information field.

FIG. 8 illustrates an example of a subfield included in a per user information field. A user information field 800 of FIG. 8 may be understood as any one of the per user information fields 1160 #1 to 1160 #N mentioned above with reference to FIG. 11. A subfield included in the user information field 80 of FIG. 8 may be partially omitted, and an extra subfield may be added. In addition, a length of each subfield illustrated may be changed.

A user identifier field 810 of FIG. 8 indicates an identifier of a STA (i.e., receiving STA) corresponding to per user information. An example of the identifier may be the entirety or part of an association identifier (AID) value of the receiving STA.

In addition, an RU allocation field 820 may be included. That is, when the receiving STA identified through the user identifier field 810 transmits a TB PPDU in response to the trigger frame, the TB PPDU is transmitted through an RU indicated by the RU allocation field 820.

The subfield of FIG. 8 may include a coding type field 830. The coding type field 830 may indicate a coding type of the TB PPDU. For example, when BCC coding is applied to the TB PPDU, the coding type field 830 may be set to '1', and when LDPC coding is applied, the coding type field 830 may be set to '0'.

In addition, the subfield of FIG. 8 may include an MCS field 840. The MCS field 840 may indicate an MCS scheme applied to the TB PPDU. For example, when BCC coding is applied to the TB PPDU, the coding type field 830 may be set to '1', and when LDPC coding is applied, the coding type field 830 may be set to '0'.

Figure 9:
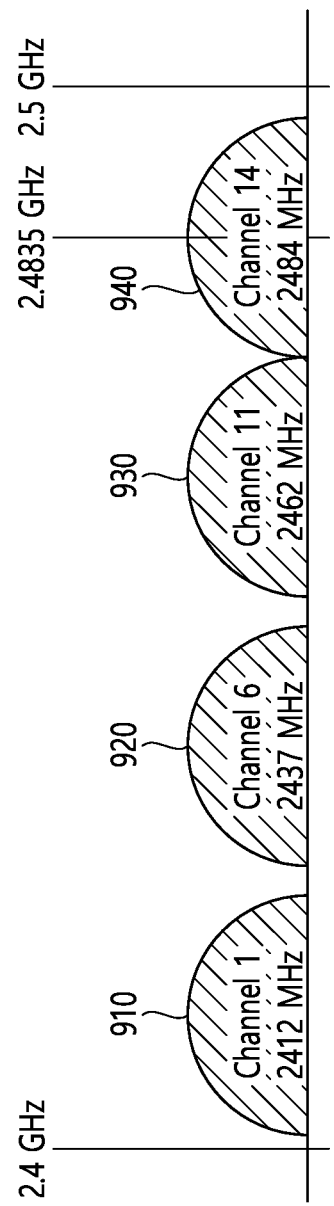
FIG. 9 illustrates an example of a channel used/supported/defined within a 2.4 GHz band.

FIG. 9 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 9 exemplifies 4 channels within a 2.4 GHz band. Each of 1st to 4th frequency domains 910 to 940 shown herein may include one channel. For example, the 1st frequency domain 910 may include a channel 1 (a 20 MHz channel having an index 1). In this case, a center frequency of the channel 1 may be set to 2412 MHz. The 2nd frequency domain 920 may include a channel 6. In this case, a center frequency of the channel 6 may be set to 2437 MHz. The 3rd frequency domain 930 may include a channel 11. In this case, a center frequency of the channel 11 may be set to 2462 MHz. The 4th frequency domain 940 may include a channel 14. In this case, a center frequency of the channel 14 may be set to 2484 MHz.

Figure 10:
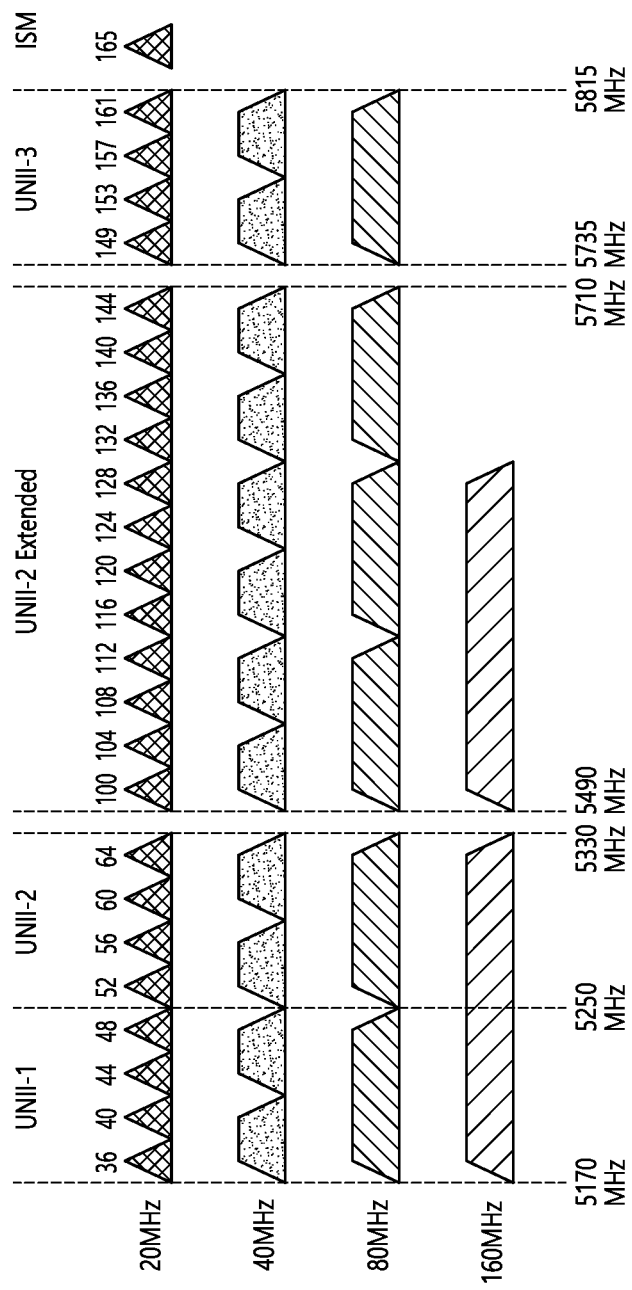
FIG. 10 illustrates an example of a channel used/supported/defined within a 5 GHz band.

FIG. 10 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 10 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 11:
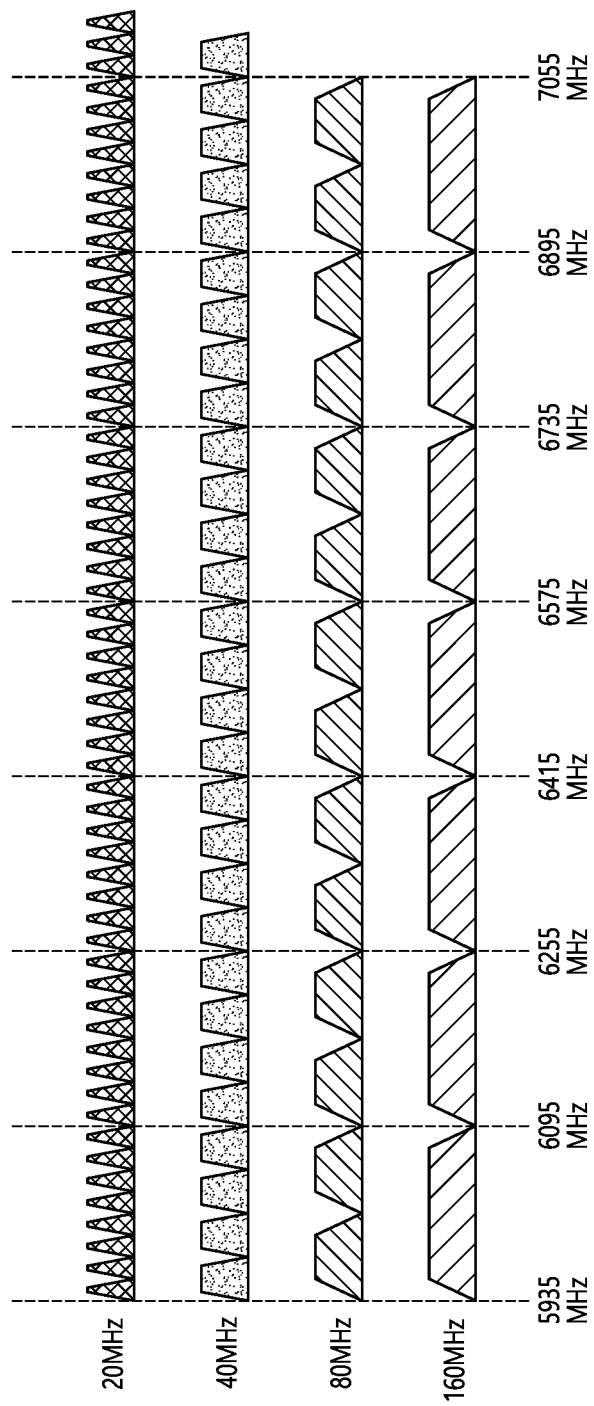
FIG. 11 illustrates an example of a channel used/supported/defined within a 6 GHz band.

FIG. 11 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 11 may be changed.

For example, the 20 MHz channel of FIG. 11 may be defined starting from 5.940 GHz. Specifically, among 20 MHz channels of FIG. 11, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 11 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 11, a 240 MHz channel or a 320 MHz channel may be additionally added.

Hereinafter, a PPDU transmitted/received in a STA of the present specification will be described.

Figure 12:
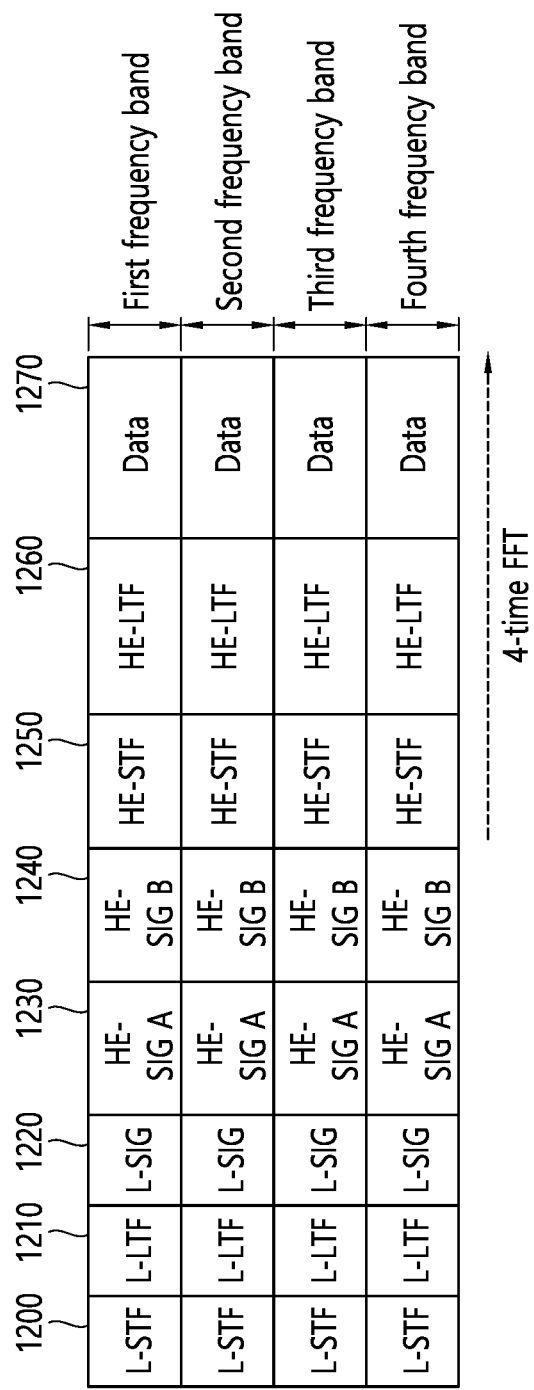
FIG. 12 shows an example of a HE-PPDU.

FIG. 12 shows an example of a HE-PPDU.

The illustrated L-STF 1200 may include a short training orthogonal frequency division multiplexing symbol (OFDM). The L-STF 1200 may be used for frame detection, automatic gain control (AGC), diversity detection, and coarse frequency/time synchronization.

The L-LTF 1210 may include a long training orthogonal frequency division multiplexing symbol (OFDM). The L-LTF 1210 may be used for fine frequency/time synchronization and channel estimation.

The L-SIG 1220 may be used to transmit control information. The L-SIG 1220 may include information related to a data transmission rate and a data length. Also, the L-SIG 1220 may be repeatedly transmitted. That is, the L-SIG 1220 may be configured in a repeated format (e.g., may be referred to as R-LSIG).

The HE-SIG-A 1230 may include control information common to the receiving station(s).

Specifically, the HE-SIG-A 1230 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcarrier modulation (DCM) is applied to the HE-SIG-B for MCS; 7) a field indicating the number of symbols used for HE-SIG-B; 8) a field indicating whether the HE-SIG-B is generated over the full/entire band; 9) a field indicating the number of symbols of the HE-LTF; 10) a field indicating a length of the HE-LTF and a CP length; 11) a field indicating whether additional OFDM symbols exist for LDPC coding; 12) a field indicating control information on Packet Extension (PE); and/or 13) a field indicating information related to a CRC field of the HE-SIG-A, and the like. At least one field of the HE-SIG-A may be omitted or changed. In addition, some fields may be added or omitted in other environments where the HE-SIG-A is not a multi-user (MU) environment.

Also, the HE-SIG-A 1230 may be composed of two parts: HE-SIG-A1 and HE-SIG-A2. The HE-SIG-A1 and HE-SIG-A2 included in the HE-SIG-A may be defined in the following format structure (field) according to a corresponding PPDU. First, the HE-SIG-A field of the HE SU PPDU may be defined as follows.

TABLE 1

| Two Parts of HE-SIG-A | Bit | Field | Number of bits | Description |
| --- | --- | --- | --- | --- |
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |
| | B2 | UL/DL | 1 | Indicates whether the PPDU is sent UL or DL. Set to the value indicated by the TXVECTOR parameter UPLINK_FLAG. |

TABLE 1-continued

| Two Parts of HE-SIG-A | Bit | Field | Number of bits | Description |
|---|---|---|---|---|
| | B3-B6 | MCS | 4 | For an HE SU PPDU:<br>Set to n for MCSn, where n = 0, 1, 2, . . . , 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 for MCS 0<br>Values 1-15 are reserved |

TABLE 2

| | Bit | Field | Number of bits | Description |
|---|---|---|---|---|
| Two Parts of HE-SIG-A | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC |
| | B8-B13 | BSS Color | 6 | The BSS Color field is an identifier of the BSS.<br>Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |

TABLE 3

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI |

TABLE 3-continued

| Two Parts of HE-SIG-A | Bit | Field | Number of bits | Description |
|---|---|---|---|---|
| | | | | Set to 3 to indicate: a 4x HE-LTF and 0.8 µs GI if both the DCM and STBC fields are 1. Neither DCM nor STBC shall be applied if both the DCM and STBC fields are set to 1. a 4x HE-LTF and 3.2 µs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8) Otherwise, B0 is set to 1 and B1-B6 is set to floor((TXOP_DURATION − 512)/128) where B0 indicates the TXOP length granularity. Set to 0 for 8 µs; otherwise set to 1 for 128 µs. B1-B6 indicates the scaled value of the TXOP_DURATION |
| | B7 | Coding | 1 | Indicates whether BCC or LDPC is used: Set to 0 to indicate BCC Set to 1 to indicate LDPC |

TABLE 4

| | Bit | Field | Number of bits | Description |
|---|---|---|---|---|
| Two Parts of HE-SIG-A | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0 |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data |

TABLE 4-continued

| Bit | Field | Number of bits | Description |
|---|---|---|---|
| | | | field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| B20-B25 | Tail | 6 | Used to terminate the trellis of the convolutional decoder. Set to 0. |

In addition, the HE-SIG-A field of the HE MU PPDU may be defined as follows.

TABLE 5

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. NOTE-The TDLS peer can identify the TDLS frame by To DS and From DS fields in the MAC header of the MPDU. |
| | B1-B3 | SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |
| | B5-B10 | BSS Color | 6 | The BSS Color field is an identifier of the BSS. Set to the value of the TXVECTOR parameter BSS_-COLOR. |
| | B11-B14 | Spatial Reuse | 4 | Indicates whether or not spatial reuse is allowed during the transmission of this PPDU Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 6

| | Bit | Field | Number of bits | Description |
|---|---|---|---|---|
| Two Parts of HE-SIG-A | B15-B17 | Bandwidth | 3 | Set to 0 for 20 MHz. Set to 1 for 40 MHz. Set to 2 for 80 MHz non-preamble puncturing mode. |

TABLE 6-continued

| Bit | Field | Number of bits | Description |
|---|---|---|---|
| | | | Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIG-B field minus 1 if the number of OFDM symbols in the HE-SIG-B field is less than 16.<br>Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1 |
| B22 | SIGB Compression | 1 | Set to 0 if the Common field in HE-SIG-B is present.<br>Set to 1 if the Common field in HE-SIG-B is not present. |

TABLE 7

| Two Parts of HE-SIG-A | Bit | Field | Number of bits | Description |
|---|---|---|---|---|
| | B23-B24 | GI + LTF Size | 2 | Indicates the GI duration and HE-LTF size:<br>Set to 0 to indicate a 4x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate a 4x HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows: |

TABLE 7-continued

| Two Parts of HE-SIG-A | Bit | Field | Number of bits | Description |
|---|---|---|---|---|
| | | | | If TXVECTOR parameter TXOP_DURATION is less than 512, then B0 is set to 0 and B1-B6 is set to floor(TXOP_DURATION/8) Otherwise, B0 is set to 1 and B1-B6 is set to floor ((TXOP_DURATION − 512)/128) where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |

TABLE 8

| | Bit | Field | Number of bits | Description |
|---|---|---|---|---|
| Two Parts of HE-SIG-A | B8-B10 | Number of HE-LTF Symbols And Midamble Periodicity | 3 | If the Doppler field is set to 0, indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1 B8-B9 indicates the number of HE-LTF symbols and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 9

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_-COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 10

| | Bit | Field | Number of bits | Description |
|---|---|---|---|---|
| Two Parts of HE-SIG-A | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 11

| | Bit | Field | Number of bits | Description |
|---|---|---|---|---|
| Two Parts of HE-SIG-A | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating channel width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 12

| | Bit | Field | Number of bits | Description |
|---|---|---|---|---|
| Two Parts of HE-SIG-A | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If the STA operating channel width is 20 MHz, then this field is set to the same value as Spatial Reuse 1 field.<br>If the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |

TABLE 12-continued

| Bit | Field | Number of bits | Description |
|---|---|---|---|
| B24-B25 | Bandwidth | 2 | Set to 0 for 20 MHz<br>Set to 1 for 40 MHz<br>Set to 2 for 80 MHz<br>Set to 3 for 160 MHz and 80 + 80 MHz |

TABLE 13

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)<br>Otherwise, B0 is set to 1 and B1-B6 is set to floor((TXOP_DURATION − 512)/128)<br>where<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

The HE-SIG-B 1240 may be included only for a multiple-user (MU) PPDU as described above. Basically, the HE-SIG-A 1250 or the HE-SIG-B 1260 may include resource allocation information (or virtual resource allocation information) for at least one receiving STA.

Figure 13:
FIG. 13 illustrates an example of a PPDU used in the present specification.

FIG. 13 illustrates an example of a PPDU used in the present specification.

The PPDU of FIG. 13 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 13 may indicate the entirety or part of a PPDU type used in the EHT system. For example, the example of FIG. 13 may be used for both of a single-user (SU) mode and a multi-user (MU) mode. In other words, the PPDU of FIG. 13 may be a PPDU for one receiving STA or a plurality of receiving STAs. When the PPDU of FIG. 13 is used for a trigger-based (TB) mode, the EHT-SIG of FIG. 13 may be omitted. In other words, a STA which has received a trigger frame for uplink-MU (UL-MU) may transmit the PPDU in which the EHT-SIG is omitted in the example of FIG. 13.

In FIG. 13, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 13 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 13, the L-LTE and the L-STF may be the same as those in the conventional fields.

The L-SIG field of FIG. 13 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 13. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 13. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 13 may include control information for the receiving STA. The EHT-SIG may be transmitted through at least one symbol, and one symbol may have a length of 4 us. Information related to the number of symbols used for the EHT-SIG may be included in the U-SIG.

The PPDU of FIG. 13 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 13. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the HE PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 13. The PPDU of FIG. 13 may be used to transmit/receive frames of various types. For example, the PPDU of FIG. 13 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 13 may be used for a management frame. An example of the management frame may include a beacon frame, a (re-)association request frame, a (re-)association response frame, a probe request frame, and a probe response frame. For example, the PPDU of FIG. 13 may be used for a data frame. For example, the PPDU of FIG. 13 may be used to simultaneously transmit at least two or more of the control frame, the management frame, and the data frame.

Figure 14:
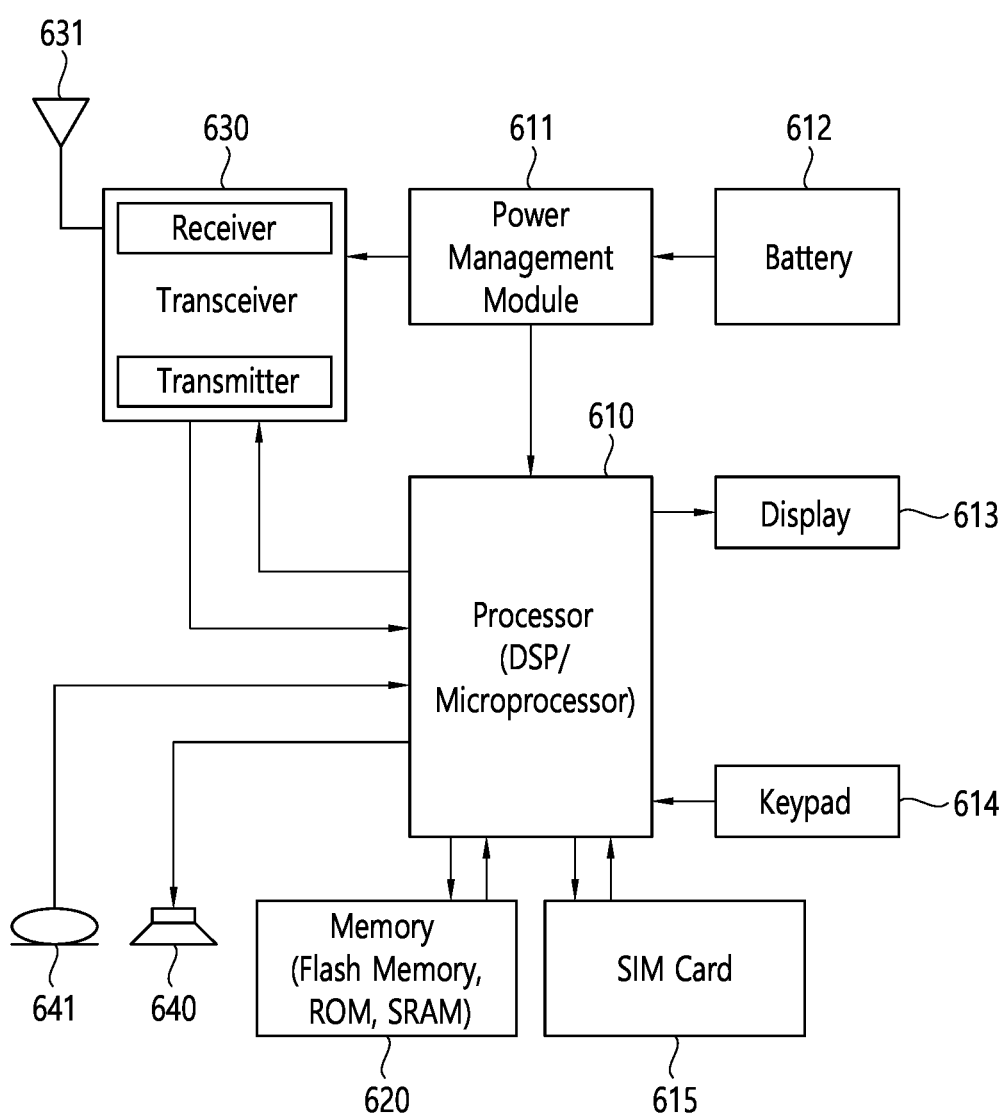
FIG. 14 illustrates an example of a modified transmission device and/or receiving device of the present specification.

FIG. 14 illustrates an example of a modified transmission device and/or receiving device of the present specification.

Each device/STA of the sub-figure (a)/(b) of FIG. 1 may be modified as shown in FIG. 14. A transceiver 630 of FIG. 14 may be identical to the transceivers 113 and 123 of FIG. 1. The transceiver 630 of FIG. 14 may include a receiver and a transmitter.

A processor 610 of FIG. 14 may be identical to the processors 111 and 121 of FIG. 1. Alternatively, the processor 610 of FIG. 14 may be identical to the processing chips 114 and 124 of FIG. 1.

A memory 620 of FIG. 14 may be identical to the memories 112 and 122 of FIG. 1. Alternatively, the memory 620 of FIG. 14 may be a separate external memory different from the memories 112 and 122 of FIG. 1.

Referring to FIG. 14, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 14, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 15:
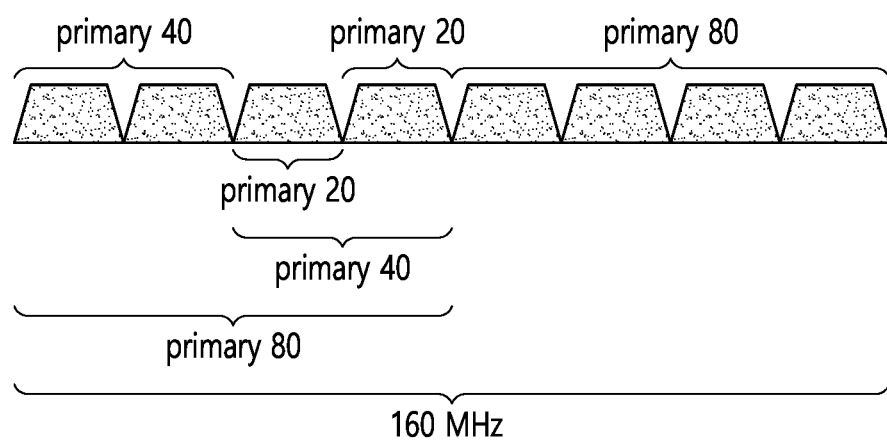
FIG. 15 illustrates an example of channel bonding.

FIG. 15 illustrates an example of channel bonding. As shown in FIG. 15, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 15, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 9, the 5 GHz band shown in FIG. 10, and the 6 GHz band shown in FIG. 11 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs an STA function, it may be referred to as a non-AP MLD.

In the following specification, the MLD has one or more connected/associated STAs and has one MAC service access point (SAP) through an upper link layer (Logical Link Control, LLC). The MLD may mean a physical device or a logical device. Hereinafter, a device may mean the MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, the AP MLD or the non-AP MLD may be configured in a structure having a plurality of links. In other words, the non-AP MLD may support a plurality of links. The non-AP MLD may include a plurality of STAs. Each of a plurality of STAs may have a link for a corresponding STA.

In the EHT standard (802.11be standard), a Multi-Link Device (MLD) structure in which one AP/non-AP MLD supports multiple links is considered as a major feature.

STA(s) included in the non-AP MLD may transmit information related to other STAs in the same non-AP MLD through one link. Accordingly, there is an effect that the overhead of frame exchange is reduced. In addition, there is an effect of increasing the link usage efficiency of the STA and reducing power consumption.

FIG. 16 illustrates an example of the structure of a non-AP MLD.

Referring to FIG. 16, the non-AP MLD may be configured in a structure having a plurality of links. In other words, the non-AP MLD may support the plurality of links. The non-AP MLD may include a plurality of STAs. The plurality of STAs may have a link for each STA. Although FIG. 16 shows an example of the structure of the non-AP MLD, the structure of an AP MLD may be configured the same as the example of the structure of the non-AP MLD illustrated in FIG. 16.

For example, the non-AP MLD may include STA 1, STA 2, and STA 3. STA 1 may operate on link 1. Link 1 may be included in a 5 GHz band. STA 2 may operate on link 2. Link 2 may be included in a 6 GHz band. STA 3 may operate on link 3. Link 3 may be included in the 5 GHz band. The bands including link 1/2/3 are provided for illustration, and link 1/2/3 may be included in 2.4, 5, and 6 GHz.

An AP/non-AP MLD supporting a multi-link, each AP of the AP MLD and each STA of the non-AP MLD may be connected to each link through a link setup process. The connected link may be changed to another link or be reconnected by the AP MLD or the non-AP MLD depending on a situation.

In the EHT standard, to reduce power consumption, links may be divided into an anchored link or a non-anchored link. The anchored link or the non-anchored link may be called variously. For example, the anchored link may be referred to as a primary link. The non-anchored link may be referred to as a secondary link.

According to an embodiment, the AP MLD supporting the multi-link may mange each link by designating each link as an anchored link or a non-anchored link. The AP MLD may support one or more links among a plurality of links as anchored links. The non-AP MLD may select and use one or more anchored links thereof from an anchored link list (a list of anchored links supported by the AP MLD).

For example, the anchored link may be used not only for a frame exchange for synchronization but also for a non-data frame exchange (i.e., a beacon and management frame exchange). The non-anchored link may be used only for a data frame exchange.

The non-AP MLD may watch (or monitor) only the anchored link to receive a beacon and a management frame during an idle period. Therefore, the non-AP MLD needs to be connected to at least one anchored link to receive a beacon and a management frame. The one or more anchored links need to always maintain an enabled state. However, the non-anchored link is used only for a data frame exchange. Therefore, a STA corresponding to the non-anchored link (or a STA connected to the non-anchored link) may enter a doze during the idle period in which the channel/link is not used. Accordingly, it is possible to reduce power consumption.

In the following specification, a protocol for the AP MLD or the non-AP MLD to dynamically recommend or request a link reconnection according to a situation for an efficient link connection may be proposed. Further, in the following specification, an anchored link reconnection protocol in consideration of a characteristic of an anchored link used for power reduction as well as a general link may be additionally proposed.

Embodiment for Link Change and Reconnection

According to an embodiment, each link between the AP MLD and the non-AP MLD may be determined in an association or (re)association process. The AP MLD and the non-AP MLD may perform a frame exchange through the connected link. A specific embodiment in which the AP MLD and the non-AP MLD are connected through a link setup process may be described with reference to FIG. 17.

Figure 17:
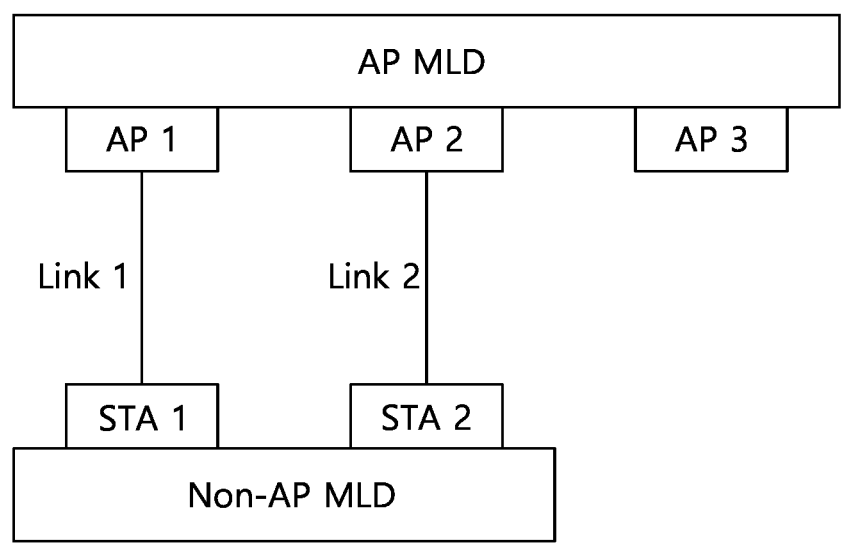
FIG. 17 illustrates an example in which an AP MLD and a non-AP MLD are connected through a link setup process.

FIG. 17 illustrates an example in which the AP MLD and the non-AP MLD are connected through a link setup process.

Referring to FIG. 17, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. In another example, the AP MLD and the non-AP MLD may be connected through a single link setup process. In other words, the AP MLD and the non-AP MLD may be connected through link 1 and link 2 based on the single link setup process.

As described above, each AP and each STA may perform a frame exchange through a connected link. In addition, through one link, information on other APs related to a different link or other STAs related to the different link may be transmitted and received.

However, after this link setup process, the AP MLD or the non-AP MLD may request a link change or reconnection for a more efficient frame exchange (e.g., load balancing or interference avoiding) depending on a situation/environment.

An embodiment related to a link change or reconnection may be described with reference to FIG. 18.

Figure 18:
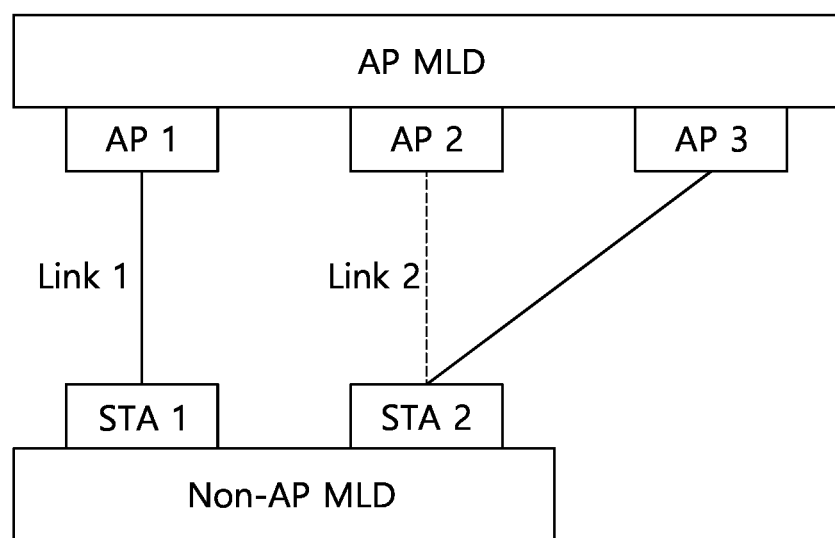
FIG. 18 illustrates an example in which a link is changed or reconnected.

FIG. 18 illustrates an example in which a link is changed or reconnected.

Referring to FIG. 18, STA 2 is conventionally connected to AP 2. Subsequently, excessive data loads may be generated in AP 2. STA 2 may be reconnected to AP 3 with a relatively small data load. In this case, the AP MLD and the non-AP MLD may perform an efficient data exchange.

Figure 19:
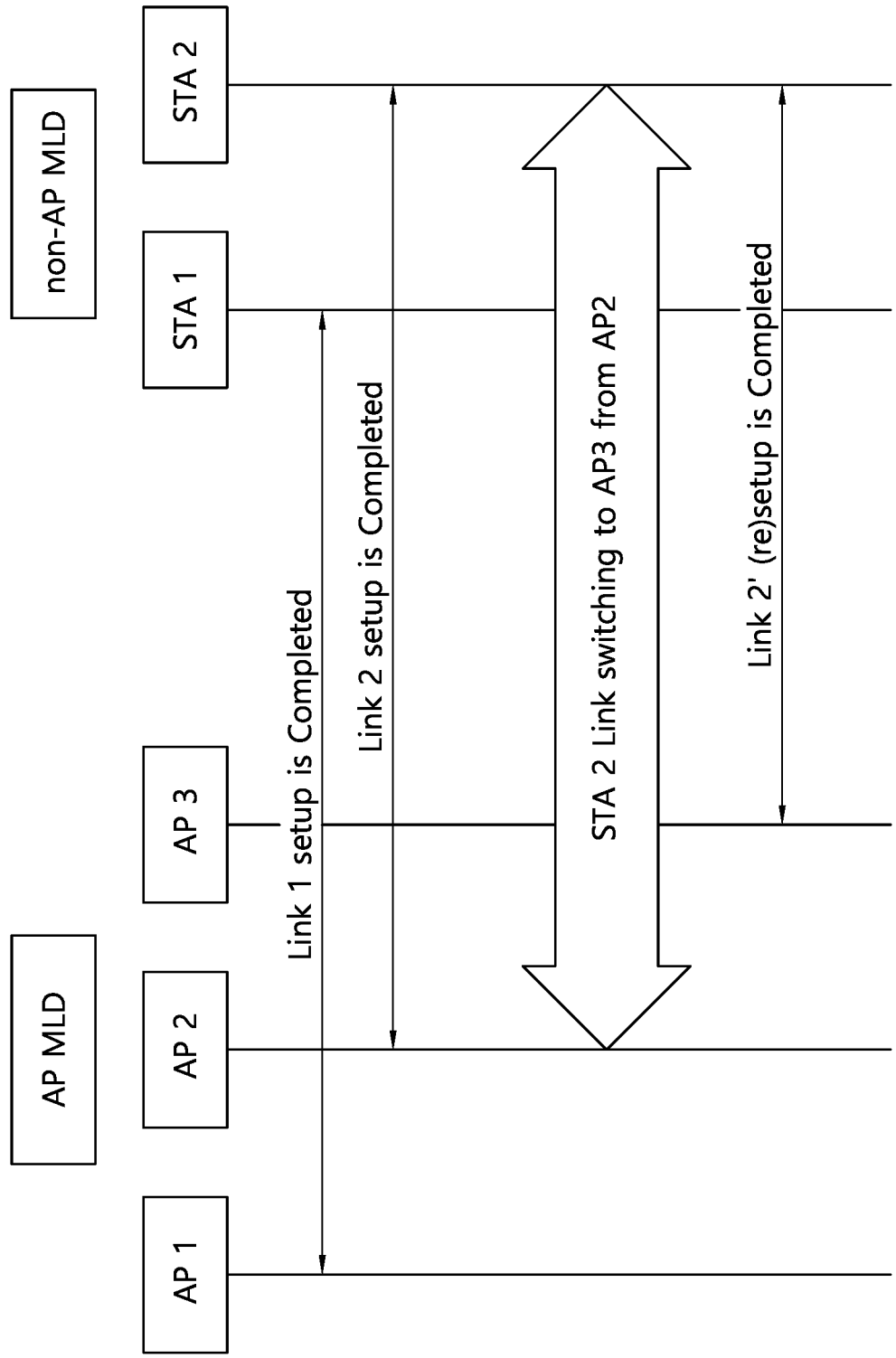
FIG. 19 illustrates a specific example in which a link is changed or reconnected.

FIG. 19 illustrates a specific example in which a link is changed or reconnected.

Referring to FIG. 19, AP 1 of the AP MLD may be connected to STA 1 of the non-AP MLD through link 1. AP 2 of the AP MLD may be connected to STA 2 of the non-AP MLD through link 2. Subsequently, STA 2 may attempt/request a connection to AP 3 through a link change or reconnection, and STA 2 may be connected to AP 3 through link 2 based on the link change or reconnection.

According to an embodiment, the non-AP MLD and the AP MLD may request a link transition to improve performance. The AP MLD and the non-AP MLD may transmit/receive/exchange various pieces of information on each current link and information on a link state. Accordingly, the AP MLD and the non-AP MLD may select a link more suitable for transmitting and receiving a signal based on the various pieces of information on each current link and the link state, and may transmit the foregoing information to help the selection. For example, the various pieces of information on each current link may include information on a data traffic load for each link and a channel access capability between links. For example, the link state may be set to "disabled" or "enabled".

In the following specification, a process in which the AP MLD/non-AP MLD negotiates with the non-AP MLD/AP MLD to request a change or reconnection to a link other than the connected link to improve performance may be referred to as a "link switching negotiation". The "link switching negotiation" may be referred to as various terms, and may be changed.

In the link switching negotiation process, the non-AP MLD (or AP MLD) may make a request to change a link connected to a specific STA to another link, and the AP MLD (or non-AP MLD) may respond to this request using a request acceptance or rejection message.

For example, as illustrated in FIG. 19, when a link change is agreed on through a link switching negotiation, the STA may perform a link re-setup process of being reconnected by changing the existing link from AP 2 to AP 3.

In the following description, link change or reconnection processes may be divided into those when requested by the AP MLD and when requested by the non-AP MLD.

Embodiment in which AP MLD Requests Link Change or Reconnection

According to an embodiment, the AP MLD may request a link change or reconnection from the non-AP MLD for efficient data transmission. For example, for load balancing, the AP MLD may request a STA to change or reconnect to a more efficient link based on data traffic of each AP.

For example, the AP MLD may calculate/identify/determine a link suitable for STAs of the non-AP MLD based on data traffic load information on each AP and/or channel access capability information on each link (e.g., information on a simultaneous TX/RX (STR) capability). Subsequently, the AP MLD may request a link change or reconnection from a STA (or non-AP MLD) based on the data traffic load information on each AP and/or the channel access capability information on each link.

As described above, when requesting the link change, the AP MLD may transmit information on a link considered to be most suitable to the non-AP MLD through a request message. For example, the request message may include a beacon or a management frame.

In relation to the foregoing embodiment, an element or field including the information on the link considered to be most suitable may be newly proposed. The newly proposed element or field may be defined as a "recommended link". The "recommended link" is provided for illustration, and a specific element or field name may be changed.

Recommend link (element/field): An element or field for the AP MLD to recommend a link most suitable for the STA of the non-AP MLD based on various pieces of information on each link (e.g., a data load for each link). For example, the recommend link (element/field) may be indicated as link ID information or AP BSS information of the AP MLD. In other words, the recommend link (element/field) may include the link ID information or the AP BSS information of the AP MLD.

According to an embodiment, the recommend link (element/field) may be optionally included in a link switching response and transmitted. For example, the STA may establish a connection to the link recommended by the AP based on the element/field (i.e., the recommend link). In another example, the STA may request a connection to a link different from the indicated link based on the element/field (i.e., the recommend Link) and additional information possessed by the STA.

A specific signal exchange process between the AP MLD and the non-AP MLD according to the foregoing embodiment may be described with reference to FIG. 20.

Figure 20:
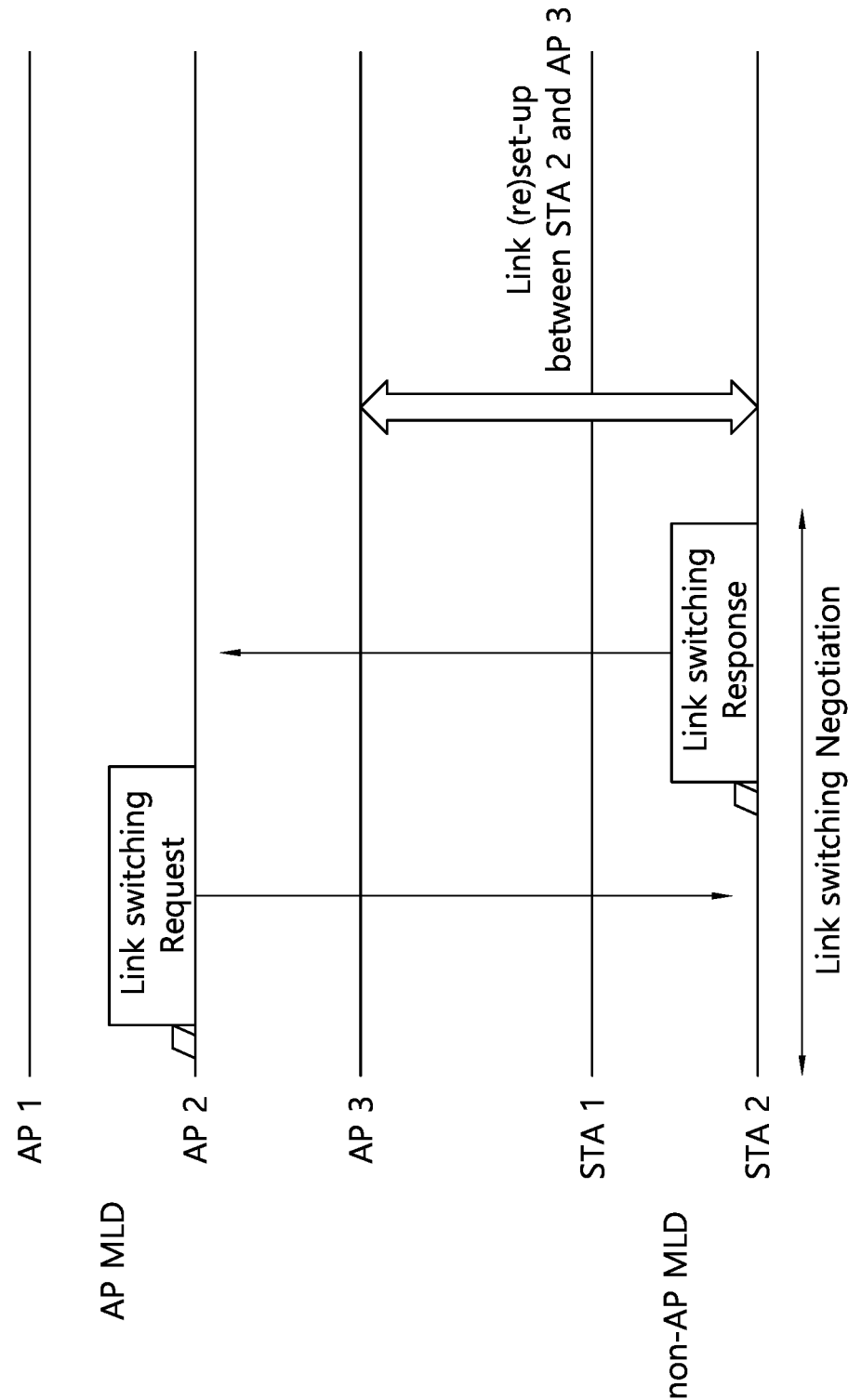
FIG. 20 illustrates the operations of an AP MLD and a non-AP MLD for a link change or reconnection.

FIG. 20 illustrates the operations of the AP MLD and the non-AP MLD for the link change or reconnection.

Referring to FIG. 20, in a situation in which STA 2 is connected to AP 2 through link 2, enormous data traffic may be concentrated in AP 2. In other words, in the situation in which the STA 2 is connected to the AP 2 through link 2, enormous data traffic may be generated in the AP 2.

The AP MLD (or AP 2) may request the non-AP MLD (or STA 2) to reconnect to AP 3 which has relatively few STA connections. A message for requesting a reconnection is generally transmitted to a STA (i.e., STA 2) that wants to reconnect, but may be transmitted to any STA (i.e., other STAs) depending on a situation (e.g., a channel state or link state). In other words, a STA to which the request message for requesting a reconnection (e.g., a link switching request frame) is transmitted may be changed based on the channel state or the link state.

For example, the STA (i.e., STA 2) having received the request message for requesting the reconnection may transmit a response message of "Accept" (e.g., a link switching response frame) when accepting the request. In another example, when the STA (i.e., STA 2) may transmit a response message of "Decline" when rejecting the request.

In general, the STA (i.e., STA 2) accepting the reconnection transmit the response message via the existing link (the connected link before the reconnection), but the response message may also be transmitted through any link (i.e., another STA) by using a characteristic of the multi-link.

When STA 2 accepts a link reconnection request, STA 2 may be disconnected from existing AP 2 and may request a link reconnection to AP 3 after transmitting a response message. Here, a reconnection request process may be performed in the same manner as the existing link setup process between the MLDs. After a link setup process between AP 3 and STA 2 is completed, STA 2 may perform a frame exchange with AP 3 through link 2.

However, when STA 2 rejects the link reconnection request, STA 2 and AP 2 may use the existing connected link (i.e., link 2) as it is.

According to an embodiment, when the AP recommends a suitable link when requesting a link change from the STA, the STA may or may not change the link to the recommended link. For example, the AP may use the foregoing recommend link to recommend the link suitable for the STA.

For example, the STA may accept the link change via the response message to the request message for requesting the reconnection from the AP. The STA may accept/identify the link change via the recommended link, and may request another link change from the AP based on information other than information included in the request message.

Accordingly, the AP needs to notify the STA of whether to accept the response message. To this end, the AP may transmit a confirmation message (e.g., a link switching confirmation frame) to the STA in response to the response message (e.g., the link switching response frame) from the STA.

Specific operations of the AP MLD and the non-AP MLD of the foregoing embodiment may be described with reference to FIG. 21.

Figure 21:
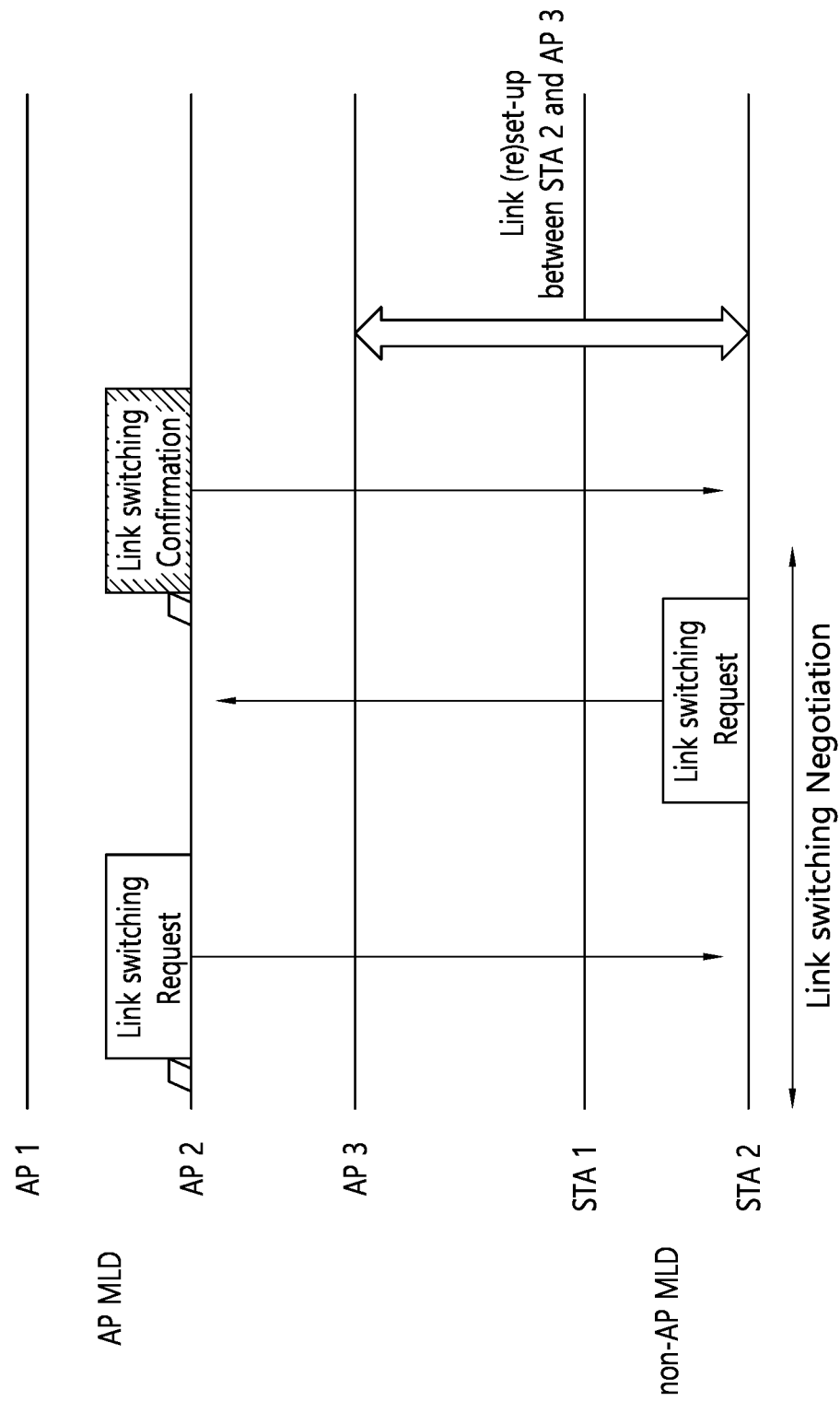
FIG. 21 illustrates the operations of an AP MLD and a non-AP MLD for a link change or reconnection.

FIG. 21 illustrates the operations of the AP MLD and the non-AP MLD for a link change or reconnection.

Referring to FIG. 21, AP 2 may request a link change including recommended link information from STA 2. In other words, AP 2 may transmit a link switching request frame including the recommended link information to STA 2.

STA 2 may transmit whether to accept a link request through a link switching response frame.

For example, when accepting link switching, STA 2 may transmit the link switching response frame link including information on a link to be changed. Here, the information on the link to be changed may or may not be the same as a recommended link.

In another example, when STA 2 responds with the link switching response frame by selecting a link other than the recommended link provided by AP 2, the AP may transmit a message with respect to whether to finally accept the link to the STA. The message may be referred to as a link switching confirmation frame.

For example, AP 2 may accept the link change to the link designated by STA 2 through the link switching confirmation frame. STA 2 may attempt the link change to the link designated by STA 2 based on the link switching confirmation frame.

In another example, AP 2 may reject the link change to the link designated by STA 2 through the link switching confirmation frame. STA 2 and AP 2 may maintain a connection via the existing connected link without changing the link.

The embodiment illustrated in FIG. 21 may be applied even when the AP transmits the link switching request frame without including the recommended link information. For example, when the AP (e.g., AP 2) transmits a link switching request frame to the STA (e.g., STA 2) without recommended link information, the STA may directly designate a link to be changed based on pieces of information possessed by the STA, and may respond to the AP with a link switching response frame. Even in this case, the AP needs to finally transmit a link switching confirmation frame for acceptance. Accordingly, an embodiment in which the AP transmits a link switching confirmation frame may be applied even when recommended link information is not included in link switching request frame.

Embodiment in which Non-AP MLD Requests Link Change or Reconnection

According to an embodiment, the non-AP MLD may request a link change or reconnection from the AP MLD for efficient data transmission. For example, to use an STR capability in data transmission, the non-AP MLD may request the AP MLD to change or reconnect a connected link.

Figure 22:
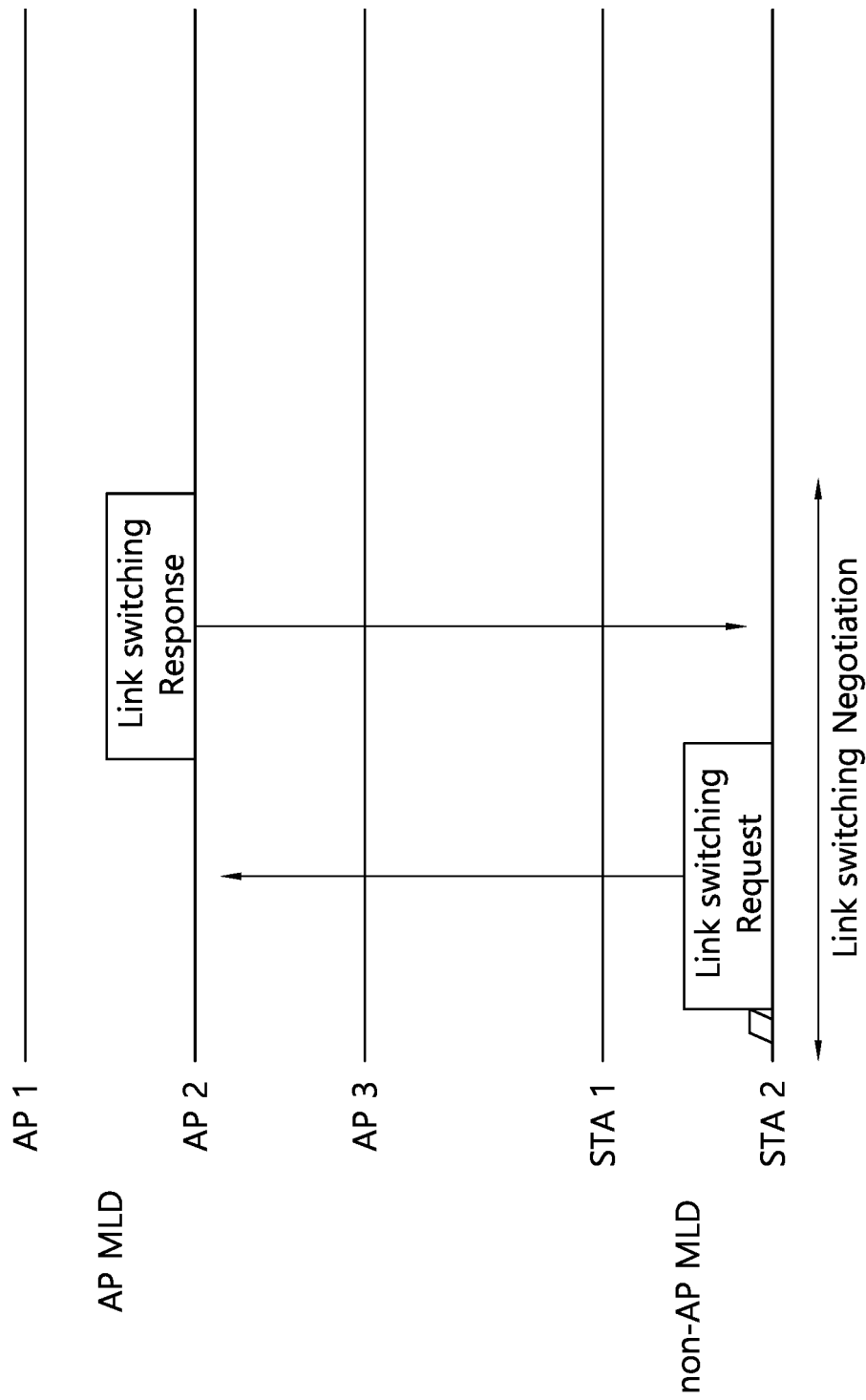
FIG. 22 illustrates the operations of an AP MLD and a non-AP MLD for a link change or reconnection.

FIG. 22 illustrates the operations of the AP MLD and the non-AP MLD for a link change or reconnection.

Referring to FIG. 22, the AP MLD and the non-AP MLD may perform a link switching negotiation. STA 2 of the non-AP MLD may transmit a link switching request frame to AP 2 of the AP MLD. AP 2 of the AP MLD may transmit a link switching response frame to STA 2 of the non-AP MLD in response to the link switching request frame. The link switching request frame or the link switching response frame may be transmitted and received through a link to be changed, but is not limited thereto. The link switching request frame or the link switching response frame may be transmitted and received through various links in addition to the link to be changed.

The non-AP MLD may request a link change or reconnection by various methods.

Hereinafter, three methods for the non-AP MLD to request a link change or reconnection may be proposed. Specifically, a solicited method, an unsolicited method, and a general method may be sequentially described as the three methods.

1) Solicited method: Method in which the non-AP MLD requests various pieces of information of APs included in the AP MLD from the AP MLD and receives the various pieces of information. For example, the various pieces of information may include information on a capability, an operation element, and BSS parameters.

According to an embodiment, a method for the STA to request information on other APs of the connected AP MLD may be used in various cases in addition to a case of reconfiguring a link. For example, after multi-link setup, for link switching, the STA may request pieces of BSS parameter information on the other APs, and may select a best link based on the pieces of received information. Alternatively, in a discovery process, the STA may request pieces of BSS load information on the respective APs from the AP MLD, and may select a link to be subjected to link setup based on the pieces of received information. (Here, it is assumed that the number of APs of the AP MLD is greater than the number of STAs of the non-AP MLD.)

Accordingly, the AP receiving an information request message may transmit any information, such as capability information, BSS parameter information, critical parameters, and/or operation element information, on all APs in the AP MLD. All of the foregoing examples may be applied to an embodiment to be described below.

2) Unsolicited method: Method in which the AP transmits various pieces of information without any request for information from the non-AP MLD. The STA may use the pieces of received information in various situations. According to an embodiment, a method for the AP of the AP MLD to transmit information on other APs without any request for information from the STA may be used in various cases in addition to a case of reconfiguring a link. Accordingly, the AP receiving an information request message may transmit any information, such as capability information, BSS parameter information, critical parameters, and/or operation element information, on all APs in the AP MLD. All of the foregoing examples may be applied to an embodiment to be described below.

3) General method: Method in which the non-AP MLD requests a link (re)selection without additional information based on information obtained through a previous beacon frame or the like.

1) Solicited Method

Hereinafter, an embodiment of the solicited method may be described.

According to an embodiment, before a link change or reconnection, the non-AP MLD may request information for selecting a suitable link from the AP MLD. To select a suitable link, the STA may utilize data load information on each AP or capability information on each link (or information on other links).

For example, the capability information on each link may be included in a beacon frame to be periodically transmitted.

In another example, the capability information on each link may be optional information, and may not be included in the beacon frame transmitted every period. Alternatively, to reduce frame overheads, only information on a link connected to the STA or some associated links may be received. Alternatively, when a beacon reception period is long due to a characteristic of the non-AP MLD (e.g., a low-power device), the non-AP MLD may not receive the capability information on each link for selecting the suitable link.

In the above-described cases, the non-AP MLD may require latest information of the capability information on each link and information on each link of the AP MLD (e.g., BSS parameter information or operation element information). A link of the capability information on each link and the information on each link may include not only a link for transmission and reception but also other links. For example, a field (A-Control field of the 11ax standard) of a QoS data frame, a management frame, a probe response/request frame, a PS-poll frame, or a null frame may be used to request/transmit the latest information. Alternatively, a separate new frame may be defined in order to request/transmit the latest information.

According to an embodiment, to request the latest information of the capability information on each link and the information on each link of the AP MLD, the STA may transmit a request message for requesting information necessary for link reselection to the AP. For example, a probe request frame conventionally defined may be reused for the request message. In another example, a new frame for the request message may be defined.

According to an embodiment, the STA may designate necessary specific information to request the specific information from the AP through the request message. The specific information that may be designated may be changed according to circumstances. That is, the STA may request only information corresponding to a specific link or only information corresponding to a specific capability. For example, the information corresponding to the specific link may include information on BSS load/parameters of the specific link. The information corresponding to the capability may include BSS load information on all links or BSS load information on a specific link. In this case, the AP may transmit only the information designated by the STA through a response message. A specific embodiment related to a request for specific information and a response may be described through an embodiment related to the definition and operation of an IOM.

In another example, the STA may request all capability information (e.g., including the information on the other links) currently possessed by the AP MLD through the request message.

As in the above examples, an embodiment for transmitting all of the information possessed by the AP or an embodiment for transmitting only the specific information designated by the STA may be defined/configured in various manners. For example, the AP may transmit all of the information or the designated information based on a separate field or bitmap to indicate (or transmit) only the specific information.

A message for requesting information from the AP MLD may be generally transmitted through a STA that wants to reconnect, but may also be transmitted to any STA (i.e., other STAs) depending on a situation (channel state or link state).

Upon receiving the request message, the AP MLD may transmit a response message (i.e., an information message) including information (e.g., data load information on each link and STR capability information between links) requested by the STA to the non-AP MLD. For example, when a conventional probe request frame is reused for the request message, the AP (or AP MLD) needs to respond using a probe response frame as the response message.

The response message may also be generally transmitted through the AP having received the request message, but may also be transmitted to any AP (i.e., other APs) by using a multi-link characteristic.

Optionally, the AP MLD may also transmit a "recommend link" element recommending a link suitable for the STA through the response message including the foregoing various pieces of information (e.g., the latest information required for the link reselection).

The foregoing solicited method may be used for the STA of the non-AP MLD to change or reconnect a link. For example, when the STA of the non-AP MLD wants link reselection due to link congestion, the STA of the non-AP MLD may request BSS load information and BSS parameter information on each link of the AP MLD connected through the solicited method. Upon receiving this request message, the AP may transmit a link and information indicated by the STA via a response message.

Hereinafter, the request message and the response message described above may be referred to as an information request message and an information response message to be distinct from a link change request message and a link change response message.

The STA may reselect a suitable link based on the information included in the information response message, and may request a link change or reconnection from the AP MLD through a link change request message. The link change request message may include information on an AP to which the STA is reconnected and information on a link to which the STA is reconnected.

Upon receiving the request message, the AP MLD may transmit a response message of "Accept" when accepting the request. The AP MLD may transmit a response message of "Decline" when rejecting the request.

When accepting the request, the AP may perform link (re)setup based on a frame exchange through a reselected link of the AP from a time after transmitting the response message. When the request is rejected, the STA may use the existing connected link as it is.

A specific example of operations of the AP MLD and the non-AP MLD according to the solicited method may be described with reference to FIG. 23.

Figure 23:
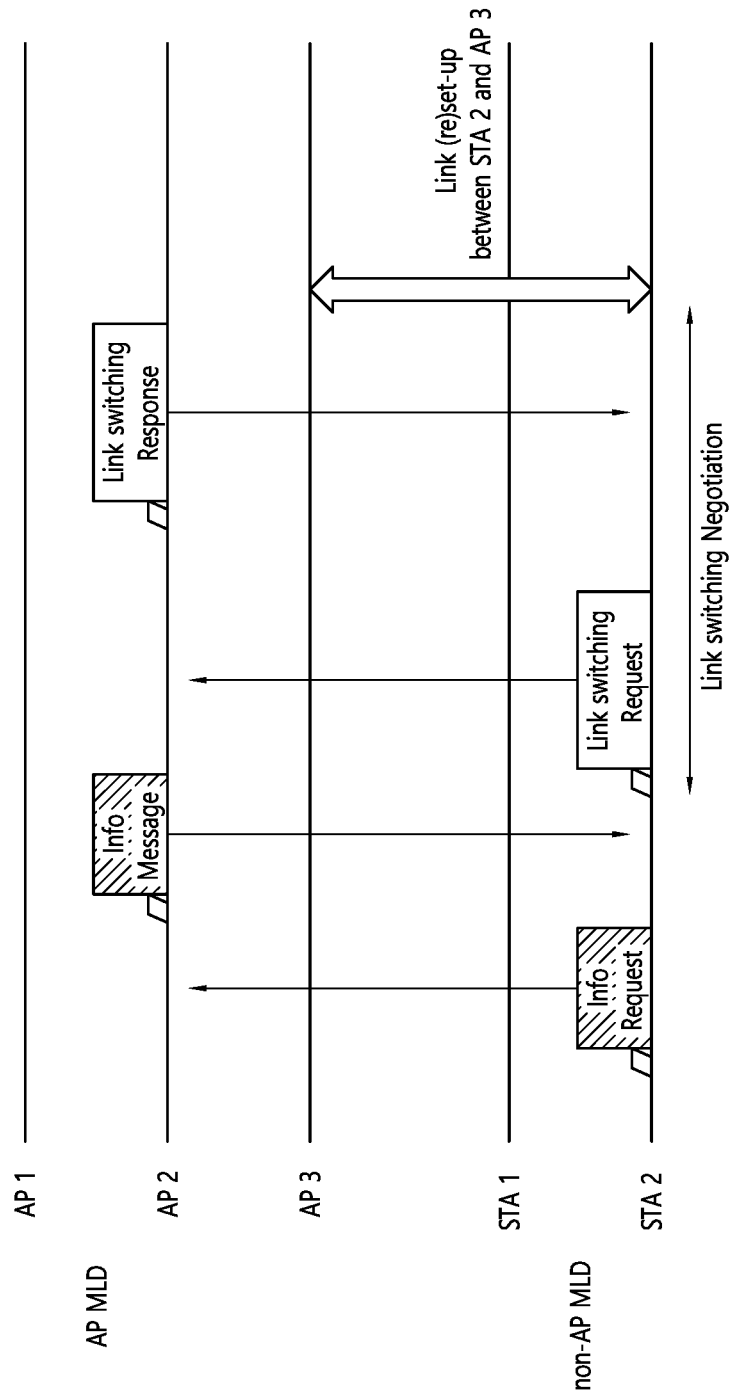
FIG. 23 illustrates the operations of an AP MLD and a non-AP MLD for a link change or reconnection.

FIG. 23 illustrates the operations of the AP MLD and the non-AP MLD for a link change or reconnection.

Referring to FIG. 23, when STA 2 of the non-AP MLD wants to reselect a connected link, STA 2 may transmit an Info request message to the AP MLD through link 2. Upon receiving the Info request message, the AP MLD may transmit an Info response message including information necessary for link reselection of the non-AP MLD. STA 2 of the non-AP MLD may transmit a link change request message (i.e., a link switching request frame) to AP 2 of the AP MLD based on the information included in the Info response message. Subsequently, STA 2 may receive a link change response message (i.e., a link switching response frame), and may perform link (re)set-up for a link change.

An embodiment of requesting information proposed in the present specification may be used/applied even when the STA requests necessary information from the AP. When information included in a frame (e.g., a beacon) received by the STA from the AP is insufficient, the STA may request needed information from the AP. For example, when the AP transmits only information on a connected link without including information on other links or only information on whether the information on the other links is updated, the STA may request needed information from the AP.

Hereinafter, a new element/field including information for the STA of the non-AP MLD to select a suitable link may be proposed.

For example, a "STA ratio per link" (element/field) may be proposed. The "STA ratio per link" may include information on the ratio of STAs connected per link. A specific example of the "STA ratio per link" may be described with reference to FIG. 24.

Figure 24:
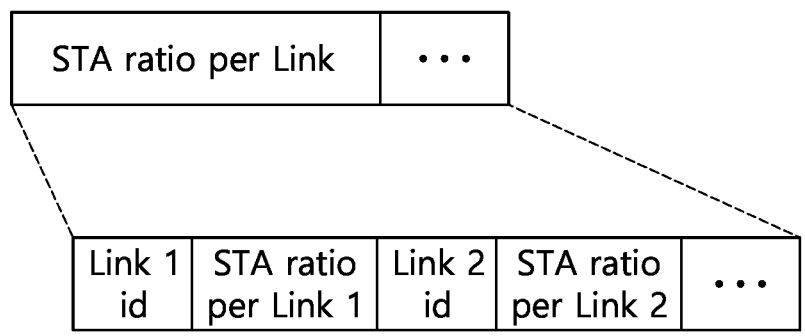
FIG. 24 illustrates a specific example of a STA ratio per link.

FIG. 24 illustrates a specific example of a STA ratio per link.

Referring to FIG. 24, the STA ratio per link (element/field) may include information on the number or ratio of STAs connected per link in the entire AP MLD.

For example, when a total of 50 STAs are connected to the AP MLD having three links, 10 STAs may be connected to link 1 and 20 STAs may be connected to link 2. The AP MLD may transmit information on STAs connected per link as information on a value or ratio (%) to the non-AP MLD through a STA ratio per link (element/field).

For example, when the information on the STAs connected per link is expressed as a value, link 1 may be expressed/set as 10 and link 2 may be expressed/set as 20. Accordingly, the value of STA ratio per link 1 may be set to 10. Further, the value of STA ratio per link 2 may be set to 20.

In another example, when the information on the STAs connected per link is expressed as a ratio, link 1 may be expressed/set as 20 ($^{10}/_{50}$)% and link 2 may be expressed/set as 40 ($^{20}/_{50}$)%. Accordingly, the value of STA ratio per link 1 may be set to 20. Further, the value of STA ratio per link 2 may be set to 40.

The foregoing examples are provided for illustration, and the information on the STAs connected per link may be variously set. In addition to the foregoing examples, the information on the STAs connected per link may be set as a relative value.

The STA may identify/obtain the number and ratio of STAs connected per link based on the information on the STAs connected per link, and may use the number and ratio as information for link selection.

According to an embodiment, in addition to the "STA ratio per link" (element/field), various pieces of information/elements/fields may be included in the information response message. For example, the following information/element/field may be included in the information response message.

BSS load information on each AP
STR capability information between links
TXOP information on each link
NAV information on each link
Information on recommended link (i.e., "recommend link" element)
Information on ratio of STA connected per link (i.e., "STA ratio per link" element)
Etc.

In addition to the foregoing information/element/field, various pieces of information necessary for link selection may be included in the information response message and transmitted.

Upon receiving the information illustrated above, the STA may select an AP to which the STA is to change or to be reconnected based on the received information, and may then transmit a request message for requesting link reconnection. Upon receiving the request message, the AP MLD may transmit a response message of "Accept" when accepting the request. The AP MLD may transmit a response message of "Decline" when rejecting the request.

When the request is accepted, the AP may perform a frame exchange through a reselected link with the AP from a time after transmitting the response message. When the request is rejected, the STA may use the existing connected link as it is.

2) Unsolicited Method

Unlike the solicited method in which the non-AP MLD directly requests additional information, the unsolicited method enables the AP MLD to transmit additional information to the non-AP MLD through a beacon frame or a separate frame (e.g., a field (A-Control field of the 11ax standard) of a QoS data frame, a management frame, a FILS discovery frame, an unsolicited probe response frame, a PS-Poll frame, or a null frame) without a request for the additional information from the non-AP MLD. In another example, a new frame may be defined as a frame for transmitting the additional information to the non-AP MLD.

For example, when a beacon period is fairly long, essential information required for link switching of the non-AP MLD may be insufficient or may not be up-to-date. Accordingly, the AP may transmit a frame including link capability information on the AP MLD to the non-AP MLD. Subsequently, the non-AP STA may obtain latest information on each link capability of the AP MLD. The frame may be periodically transmitted or may be aperiodically transmitted.

For example, when the frame is periodically transmitted, the AP may transmit the frame at a regular time interval to share latest information on the AP. Here, the time interval needs to be shorter than a period of a beacon transmitted by the AP. Further, when a FILS discovery frame is used as the frame, the frame may be transmitted every 20 us. In another example, a period agreed by the AP and the STA through a capability negotiation may be used. For example, a transmission period may be indicated through the value of a "periodic" field and an "interval" field/subfield of an IOM capability element.

In another example, when the frame is aperiodically transmitted, the AP may transmit the frame whenever an event of updating information (a capability, a BSS parameter, and an operation element) on the AP occurs. In a specific example, whenever a link capability of the AP of the AP MLD is changed, changed information may be transmitted to the connected STA. In this case, the STA may maintain latest information on the link capability.

According to the foregoing example, since the non-AP STA does not transmit a separate request message for obtaining the link capability, a frame exchange overhead is relatively small compared to the solicited method. In addition, since the STA may receive updated information whenever main information is updated, the STA may effectively use the received information.

A specific example of operations of the AP MLD and the non-AP MLD according to the unsolicited method may be described with reference to FIG. 25.

Figure 25:
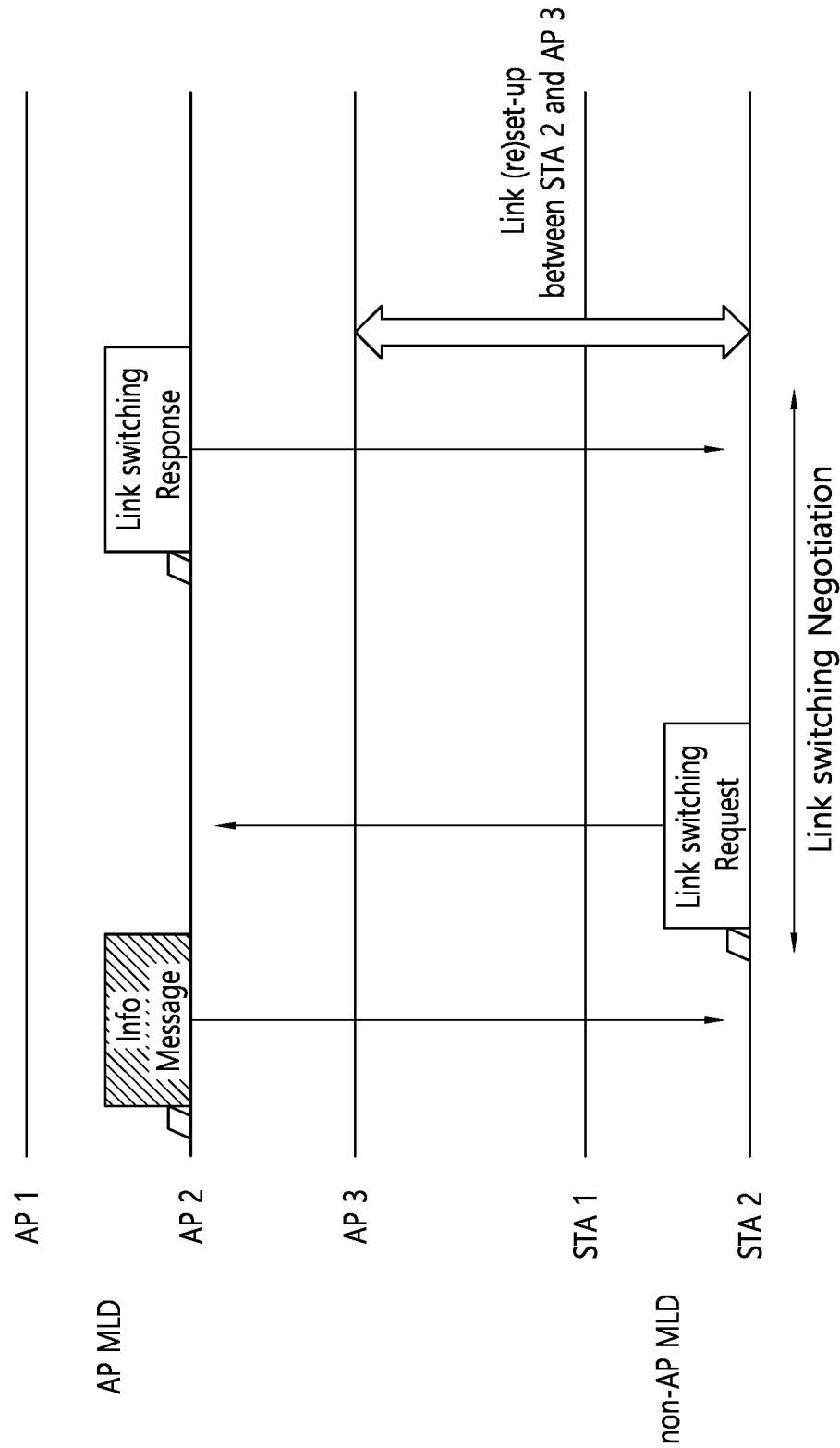
FIG. 25 illustrates the operations of an AP MLD and a non-AP MLD for a link change or reconnection.

FIG. 25 illustrates the operations of the AP MLD and the non-AP MLD for a link change or reconnection.

Referring to FIG. 25, the AP MLD may transmit essential information required for link reselection to the non-AP via a separate frame (e.g., an Info message) without any request message from the non-AP MLD.

According to an embodiment, unlike FIG. 25, the AP MLD may transmit pieces of information on a link capability to the STA through a field of a DL frame (e.g., a QoS data frame) transmitted by the AP MLD to the non-AP MLD without any request message from the non-AP MLD.

Accordingly, the non-AP MLD may obtain latest link capability information regardless of a beacon frame period. The non-AP MLD may select a suitable link based on the received information in link switching. The STA may reselect a suitable link based on the received information, and may request a link change or reconnection from the AP MLD. The request message may include information on an AP to which the STA is to be reconnected and information on a link to which the STA is to be reconnected. Upon receiving the request message, the AP MLD may transmit a response message of "Accept" when accepting the request, and may transmit a response message of "Decline" when rejecting the request.

When the request is accepted, the AP may perform a frame exchange through a reselected link with the AP from a time after transmitting the response message. When the request is rejected, the STA may use the existing connected link as it is.

3) General Method

According to the general method, the non-AP MLD may request a link change or reconnection based on information currently possessed by the non-AP MLD without requesting additional information. Here, the used information may include information on the AP MLD and information on the non-AP MLD (e.g., STR capability information on each link and link state (enabled/disabled) information) included in a previously received beacon or management frame.

Unlike the solicited method, the STA may directly transmit a request message for a link change or reconnection to the AP MLD without separately requesting information from the AP MLD. The request message may include information on an AP to which the STA is to be reconnected and information on a link to which the STA is to be reconnected. Upon receiving the request message, the AP MLD may transmit a response message of "Accept" when accepting the request, and may transmit a response message of "Decline" when rejecting the request.

When the request is accepted, the AP may perform a frame exchange through a reselected link with the AP from a time after transmitting the response message. When the request is rejected, the STA may use the existing connected link as it is.

A specific example of operations of the AP MLD and the non-AP MLD according to the general method may be described with reference to FIG. 26.

Figure 26:
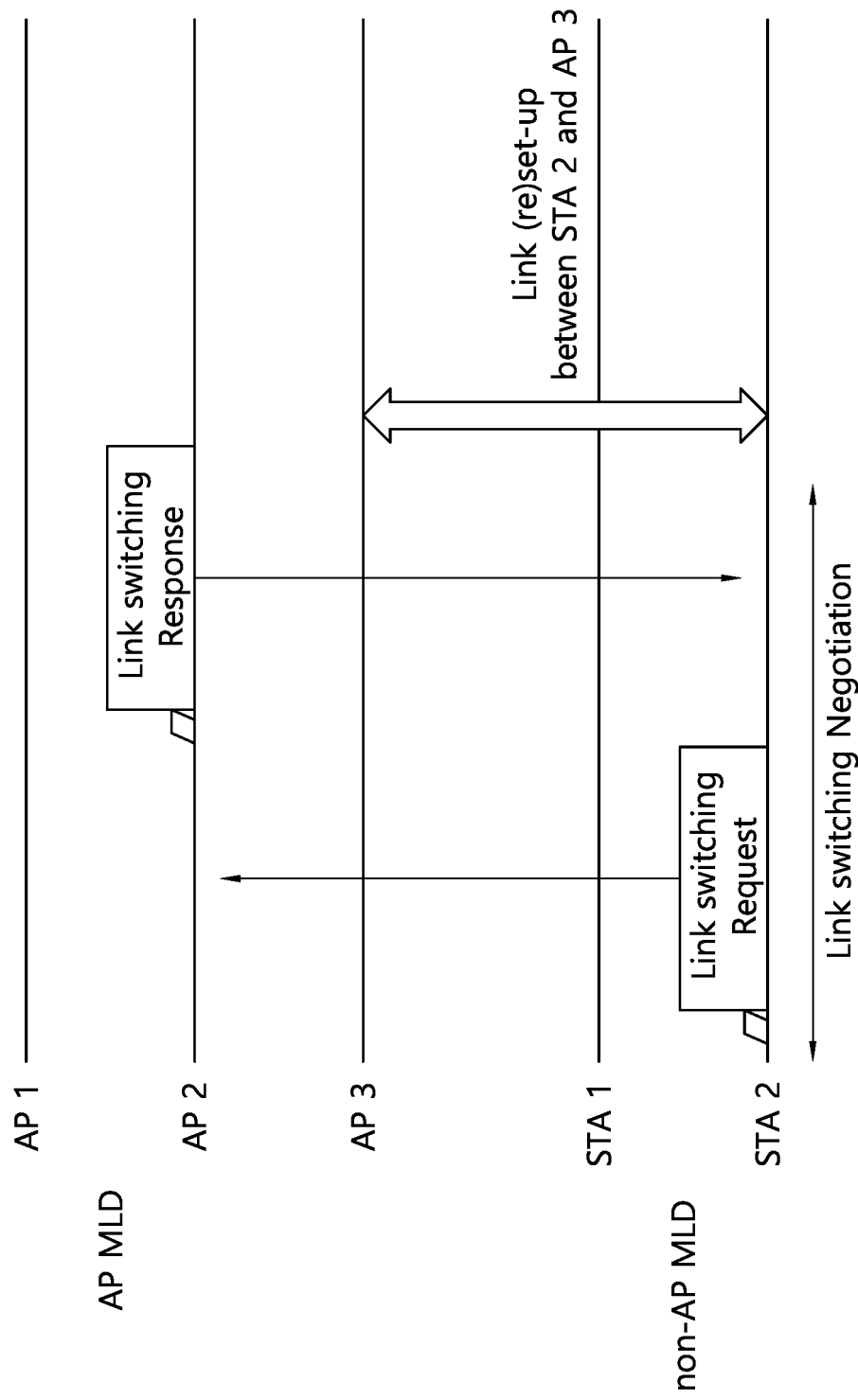
FIG. 26 illustrates the operations of an AP MLD and a non-AP MLD for a link change or reconnection.

FIG. 26 illustrates the operations of the AP MLD and the non-AP MLD for a link change or reconnection.

Referring to FIG. 26, STA 2 may want to directly change a link for a guarantee of QoS. When STA 2 has previously received information (e.g., information received through a beacon frame or management frame) from the AP MLD or has already determined a link to which STA 2 wants to reconnect, STA 2 may request a link change or reconnection without separately requesting additional information.

STA 2 may transmit a link switching request frame including STA information (e.g., a STA ID) and information on a link to which STA 2 wants to change (e.g., a link ID or AP BSS information). Upon receiving this frame, the AP MLD may transmit a link switching response frame of "Accept" to STA 2 through existing link 2 when accepting the change. Subsequently, STA 2 of the non-AP MLD may perform a link (re)setup process, and may then be reconnected to AP 3.

Signaling for Indicating Link Change and Reconnection Method

To indicate the methods proposed above, a mutual agreement process may be required through a negotiation between the AP MLD and the non-AP MLD. To this end, in the following specification, a signaling method for enabling methods to be proposed may be proposed.

First, to indicate the methods proposed above, a new element may be proposed. Hereinafter, an embodiment of signaling for indicating a link change and reconnection method is described, and this embodiment may also be applied to an embodiment of signaling for indicating an anchored link change and reconnection method.

A signaling process for indicating a link change and reconnection method may be performed in multi-link setup or after the multi-link setup. In addition, new elements proposed below may be used in the signaling process for indicating the link change and reconnection method. For example, the elements may be included in an (re)association frame of a conventional standard or a new frame.

Information Obtain Method (IOM) Capability Element

An IOM capability element may include information on whether to enable a method of obtaining additional information for a multi-link. For example, in a process (e.g., a capability negotiation process) in which the AP MLD and the non-AP MLD exchange a message to agree on an operation in a multi-link setup process, an IOM capability value may exist in an element in the message. The IOM capability value existing in the element in the message may mean that an IOM capability is supported.

According to an embodiment, when the AP MLD supports the IOM capability, information on other APs may be internally shared with the AP, and the AP may have the information on the other APs. An MLD with which the information on the other APs is not shared is not able to support the IOM capability.

According to an embodiment, when the value of the IOM capability element is set to a first value (e.g., 1), the IOM capability element may indicate that the IOM is enabled and an indicated function operates. When the value of the IOM capability element is set to a second value (e.g., 0), the IOM capability element may indicate that the IOM is disabled.

According to an embodiment, the IOM capability element may include various fields/elements to indicate various operations. For example, the IOM capability element may include various fields/elements described below. However, a field/element added to the IOM capability element may be differently configured according to a case in which the AP MLD requests a link change and a case in which the non-AP MLD requests a link change. Further, at least some of fields/elements added to the IOM capability element may be omitted. For example, a field/element including information not required to be indicated among the fields/element added to the IOM capability element may be omitted.

Hereinafter, examples of various fields/elements defined/configured to obtain additional information on a multi-link may be described. Various fields/elements described below may be independently configured, or two or more fields/elements may be combined and transmitted through various frames. For example, various fields/elements described below may be included in other elements to perform a defining operation. In another example, various fields/elements described below may be used by being added to other elements as separate elements or as independent fields.

Method Type (or Method) Field/Element

A method type field/element (hereinafter, a method field/element) may include information on an operation method of the IOM. In other words, the method field/element may indicate the operation method of the IOM. For example, when the non-AP MLD enables the IOM to obtain information from the AP, the non-AP MLD may select and indicate a method to be used from among the methods proposed above (e.g., the solicited method, the unsolicited method, and the general method).

For example, the solicited method may be indicated/used based on the value of the method field/element being a first value (e.g., 0). The unsolicited method may be indicated/used based on the value of the method field/element being a second value (e.g., 1). The general method may be indicated/used based on the value of the method field/element being a third value (e.g., 2). Both the solicited method and the unsolicited method may be indicated/used based on the value of the method field/element being a fourth value (e.g., 3).

In another example, one bit may be used for the method field/element. In this case, the solicited method may be indicated/used based on the value of the method field/element being a first value (e.g., 0). The unsolicited method may be indicated/used based on the value of the method field/element being a second value (e.g., 1).

In another example, two bits may be used for the method field/element. In this case, the methods may be indicated to be used independently or in combination.

Link Range Field/Element

When the non-AP MLD requests information from the AP MLD, the non-AP MLD may indicate a requested link range through a link range field/element. The link range field/element may include information on whether the STA wants to request information on all links in the AP MLD or information on some links in the AP MLD.

For example, when the value of the link range field/element is a first value (e.g., 0), the link range field/element may indicate that information on all links in the AP MLD is requested. When the value of the link range field/element is a second value (e.g., 1), the link range field/element may indicate that information on some links in the AP MLD is requested.

Here, when the value of the link range field/element is the first value (e.g., 0), which is a request for all links in the AP MLD, separate link indicator information (e.g. a "link condition" field) is not required. When the value of the link range field/element is the second value (e.g., 1), which is a request for the information on some links in the AP MLD, link indicator information is required.

Info Range Field/Element

An info range field may be used to indicate the range of information when the non-AP MLD requests the information.

For example, when the value of the info range field is a first value (e.g., 0), the info range field may indicate that only partial information possessed by the AP is provided. When the value of the info range field is a second value (e.g., 1), the info range field may indicate that complete information (or all information) possessed by the AP is provided.

According to an embodiment, the info range field may be defined to indicate a request for all or partial of the information (element) possessed by the AP, but the STA may request more detailed information through an additional subfield. For example, a subfield for indicating the range of information to be provided (e.g., all information or partial information) may be included in the info range field. For example, the subfield for indicating the range of the information to be provided may be defined/configured as an all/partial subfield.

According to an embodiment, a subfield for indicating whether to receive all information or only changed information among all the information may be newly proposed. In other words, the newly proposed subfield may indicate whether to receive all information or only changed information among all the information.

For example, the subfield for indicating whether to receive all information or only changed information among all the information may be defined/configured as an only updated subfield.

When the STA wants to receive only changed information, the value of the only updated subfield may be set to 1. In other words, when the STA wants to receive only changed information, the STA may set the value of the only updated subfield to 1. For example, according to the solicited method, when the value of the only updated subfield is set to 1, the AP (or AP MLD) may transmit only changed information (i.e., updated information) among requested information when the STA requests the information. In another example, according to the unsolicited method, when the value of the only updated subfield is set to 1, only changed information in an information range set by the STA may be notified by the AP.

Although the only updated subfield in the info range field is proposed to receive only changed information in the above example, the present specification is not limited thereto. A separate field or element may be defined/configured to receive only changed information.

According to the foregoing embodiment, the range of information that the STA is allowed to request may be set to updated information or all information. In this case, the STA that does not want high frame overhead may request reception of only changed information. Accordingly, it is possible to reduce overhead.

Link Condition Field/Element

A link condition field may be used to indicate a requested specific link. In other words, the link condition field may include information on the requested specific link. The link condition field may be used when the STA wants to receive only specific link information from the AP.

The link condition field may be indicated by a link identifier (e.g., a link ID or a BSS ID). In other words, the link condition field may include information on the link identifier (e.g., the link ID or the BSS ID). In other words, the link identifier may be used to specify a link for obtaining information.

For example, when the STA connected to link 1 wants to request only information on link 2 and link 3 from the AP, the STA may request the information on link 2 and link 3 from the AP by indicating link 2 and link 3 in a link condition field. For example, when the value of the foregoing info range field is 1, all information corresponding to link 2 and link 3 may be transmitted. In another example, when the value of the info range field is 0, partial information on link 2 and link 3 designated by the STA may be transmitted. According to an embodiment, partial information designated by the STA may be determined through the following Info condition field.

According to an embodiment, when the link condition field has no value or has a value of 0, the AP may determine that there is no link condition. Accordingly, the AP may provide/transmit information on all links to the STA.

Info Condition Field/Element

An info condition field may be used to indicate a requested specific information type. In other words, the info condition field may be used when the STA wants to receive only specific information from the AP.

For example, the info condition field may be used only when the info range field is set to 0. In another example, the info condition field may be used by the STA to indicate specific information even when there is no info range field.

For example, in the info condition field, information (e.g., a BSS load or an STR capability) specifiable by the STA may be indicated by a bitmap. For example, the type of information provided by the AP and an indication method or order thereof in bits may be variously set.

According to an embodiment, the info condition field may be used together with the foregoing link condition field. According to an embodiment, the info condition field may transmit requested information of various conditions to the STA (or AP) based on a combination of various fields/elements.

According to an embodiment, a field/element defined/configured to obtain additional information on a multi-link is not limited to the foregoing field/elements, and various fields/elements may be further configured.

Therefore, the MLD (AP MLD or non-AP MLD) may indicate an IOM capability through a negotiation between the AP MLD and the non-AP MLD using at least one of the elements/fields described above in the multi-link setup process. In addition, the MLD may update the agreement between the MLDs through a separate message exchange after the multi-link setup is completed.

According to an embodiment, when the IOM capability is enabled, the AP MLD and the non-AP MLD may operate based on an embodiment for a link change and reconnection.

Hereinafter, an example of operations of the AP MLD and the non-AP MLD when the IOM capability is enabled may be described. For example, the non-AP MLD may request additional information for a multi-link by transmitting the foregoing fields/elements to the AP MLD. The non-AP MLD may transmit an IOM capability element including the foregoing fields/elements to the AP MLD. The foregoing fields/elements being included in the IOM capability element is for illustration, and the fields/elements may also be transmitted as independent fields/elements.

For example, in the multi-link setup process, the non-AP MLD may transmit an IOM capability element including "Method field=0" and "Info range field=1" to the AP MLD, and may agree thereon with the AP MLD. In this case, after multi-link setup, the non-AP MLD operates according to the solicited method, and may request information for the multi-link (e.g., information on other APs) including all information included in a beacon when request information. Accordingly, the AP MLD may provide/transmit information on a link via a response message only when receiving a request message from the STA. When receiving the request message, the AP MLD may transmit the response message including information on all links in the AP MLD to the STA. The information on all links in the AP MLD may include all information included in the beacon.

In another example, the non-AP MLD may transmit an IOM capability element including "Method field=1", "Info range field=0", "Link range=Link id 2", and "Info condition field=(value indicating BSS load through bitmap) to the AP MLD, and may agree thereon with the AP MLD. In this case, after multi-link setup, the non-AP MLD may operate according to the unsolicited method. Accordingly, the AP may transmit BSS load information of link 2 to the STA through a separate message without receiving a separate request message.

According to an embodiment, the AP MLD and the non-AP MLD may enable the proposed IOM through the signaling method proposed in the present specification during the multi-link setup process or after the multi-link setup. In addition, the AP MLD and the non-AP MLD may limit the range and type of requested information through various field values in the IOM capability element.

According to an embodiment, an IOM operation may be performed after an accurate operation negotiation between the MLDs through the foregoing IOM signaling method, but the IOM operation may also be performed by implementation by the MLDs without a separate signaling process. That is, the operation may be performed by implementation by the AP MLD or by implementation by the non-AP MLD without a negotiation between the AP MLD and the non-AP MLD.

The AP MLD and the non-AP MLD may operate based on the foregoing embodiments. However, when the MLDs perform the IOM operation without a separate signaling exchange, the following constraints may occur.

1) Constraints on the solicited method: When information sharing is not supported between APs of the AP MLD, it is impossible to respond when the STA requests information on another link.

2) Constraints on the unsolicited method: The AP may provide a separate message by autonomously determining a STA that needs additional link information (e.g., a beacon period). Accordingly, the STA cannot predict in advance whether the STA will receive this information.

When the MLDs implement the IOM without a separate signaling method, an operation process may be simplified, whereas the foregoing constraints may occur.

Embodiment for Anchored Link Change and Reconnection

According to an embodiment, the AP MLD may support an anchored link. When the AP MLD supports the anchored link, there are additional considerations to be taken into account in the foregoing embodiment for the link change and reconnection.

The AP MLD may support one or more anchored links, and may provide information on one or more anchored links to the non-AP MLD through anchored link list information/element. The non-AP MLD may select and use one or more links in the anchored link list as anchored links thereof. Links other than those selected as the anchored links may operate as non-anchored links.

An anchored link and a non-anchored link have a trade-off relationship in terms of power consumption and data load. That is, when the non-AP MLD uses one anchored link, power consumption may be reduced, whereas QoS of data (especially, data on a beacon and a management frame) transmission may not be guaranteed. However, when a plurality of anchored links is used, QoS of data transmission may be guaranteed, whereas the amount of power reduction may be reduced.

Therefore, the non-AP MLD needs to be able to dynamically request reselection of an anchored link for an efficient data exchange. Hereinafter, an embodiment in which the non-AP MLD dynamically requests an anchored link change/reselection may be proposed.

First, an MLD structure supporting an anchored link may be described with reference to FIG. 27.

Figure 27:
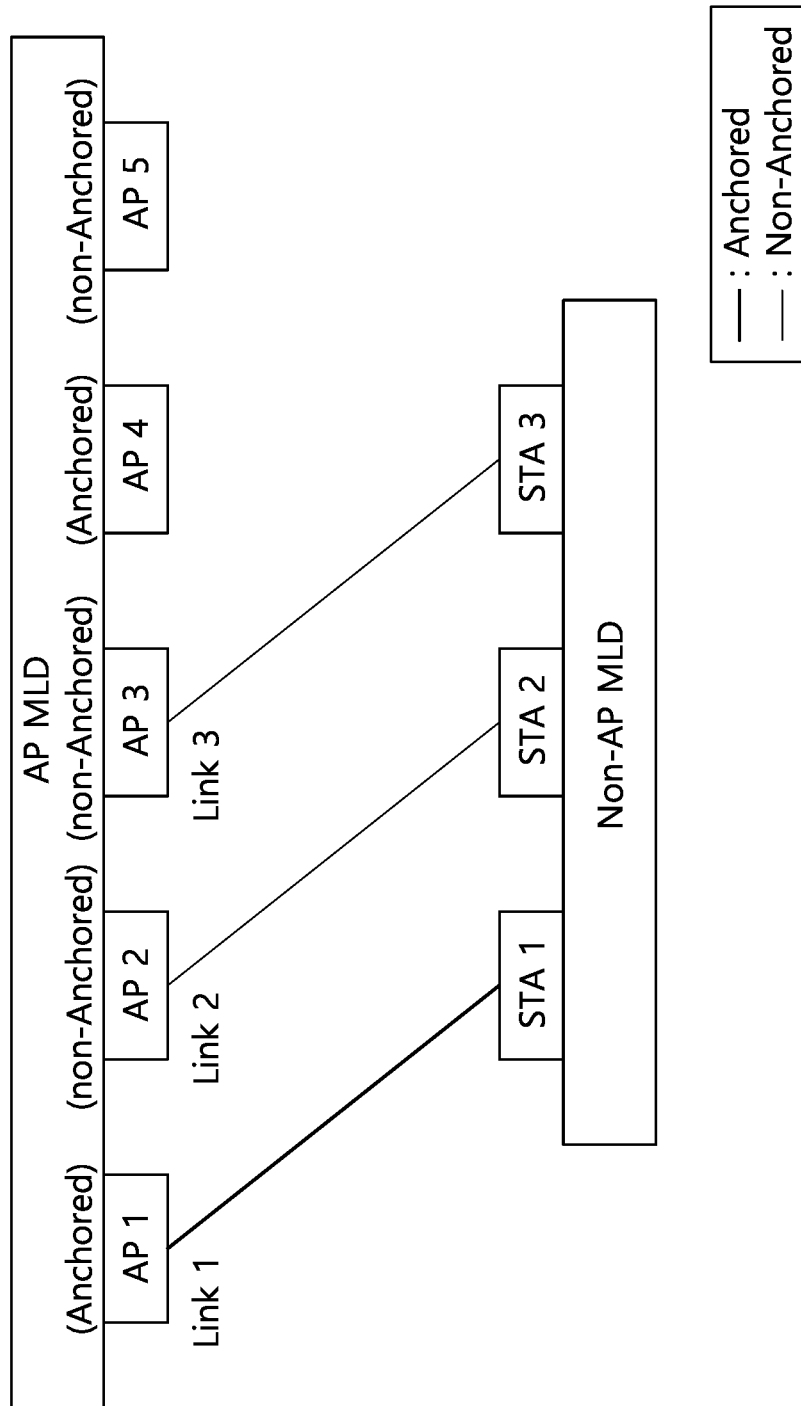
FIG. 27 illustrates an example of an MLD structure supporting an anchored link.

FIG. 27 illustrates an example of an MLD structure supporting an anchored link.

Referring to FIG. 27, an AP MLD may use two links (i.e., AP 1 and AP 4) among five links as anchored links. A non-AP MLD may use one anchored link by selecting link 1 among the two links used as the anchored links. The remaining links of the non-AP MLD may be connected to non-anchored links (link 2 and link 3). That is, the non-AP MLD needs to always monitor link 1 to receive a beacon and a management frame.

According to an embodiment, STA 1 may make a request to change a previously used anchored link from the anchored link of AP 1 to the anchored link of AP 4 for load balancing or the like. To change the anchored link, the foregoing embodiment related to link switching may be applied.

However, some limited links among links supported by the AP MLD are supported as anchored links. Accordingly, the AP MLD may have a separate anchored link list. The non-AP MLD (or STA) needs to select one link included in the anchored link list and to request a change or reconnection thereto. In addition, the non-AP MLD needs to have at least one anchored link, and thus needs to request an anchored link change in consideration of this aspect when requesting a link change or reconnection.

For the foregoing embodiment, the AP MLD needs to additionally provide "Anchored Link List" information to the non-AP MLD. This information may be included in a frame in the form of a new element or field. The term "Anchored Link List" is for illustration, and may be set/expressed variously.

"Anchored link list" (element/field): List information of anchored links currently supported by the AP MLD. For example, the list information of the anchored links currently supported by the AP MLD may be indicated/set by one or more link IDs or AP BSS values. The non-AP MLD needs to be connected to at least one anchored link among the links included in the list.

The foregoing information (e.g., "Anchored Link List" (element/field)) may be included and transmitted in an existing beacon or management frame, or may be included and transmitted in an info response message to the non-AP MLD according to the solicited method.

Accordingly, when the non-AP MLD requests a change of an anchored link used by the non-AP MLD, the non-AP MLD needs to know currently supported anchored link list information in advance. When the non-AP MLD does not know the anchored link list information or wants to obtain the latest information, the non-AP MLD may obtain the information from the AP MLD according to the solicited method.

The STA may request a change or reconnection to only one link in the anchored link list based on the anchored link list information. When the STA requests a change or reconnection to another link not included in the list, the AP MLD may transmit a rejection message to the STA.

When changing or reconnecting an anchored link, there is an additional consideration to be taken into account in addition to the existing link change method. There are two general cases where the STA of the non-AP MLD changes an anchored link.

In a first case, the STA already connected to the anchored link changes to another anchored link of the AP MLD for load balancing or the like (change of AP for an anchored link). In a second case, the STA connected to the anchored link is disabled due to a power state or the like, and thus another STA of the non-AP MLD is reconnected to the anchored link (STA change for an anchored link).

The first case may operate similarly/equally to the foregoing embodiment for the link change and reconnection. Here, when the STA reselects a link, the STA needs to select a link in the anchored link list supported by the AP MLD. When another link is selected, the AP MLD may transmit a rejection response message.

The second case requires an additional consideration. An example of the second case may be described with reference to FIG. 28.

Figure 28:
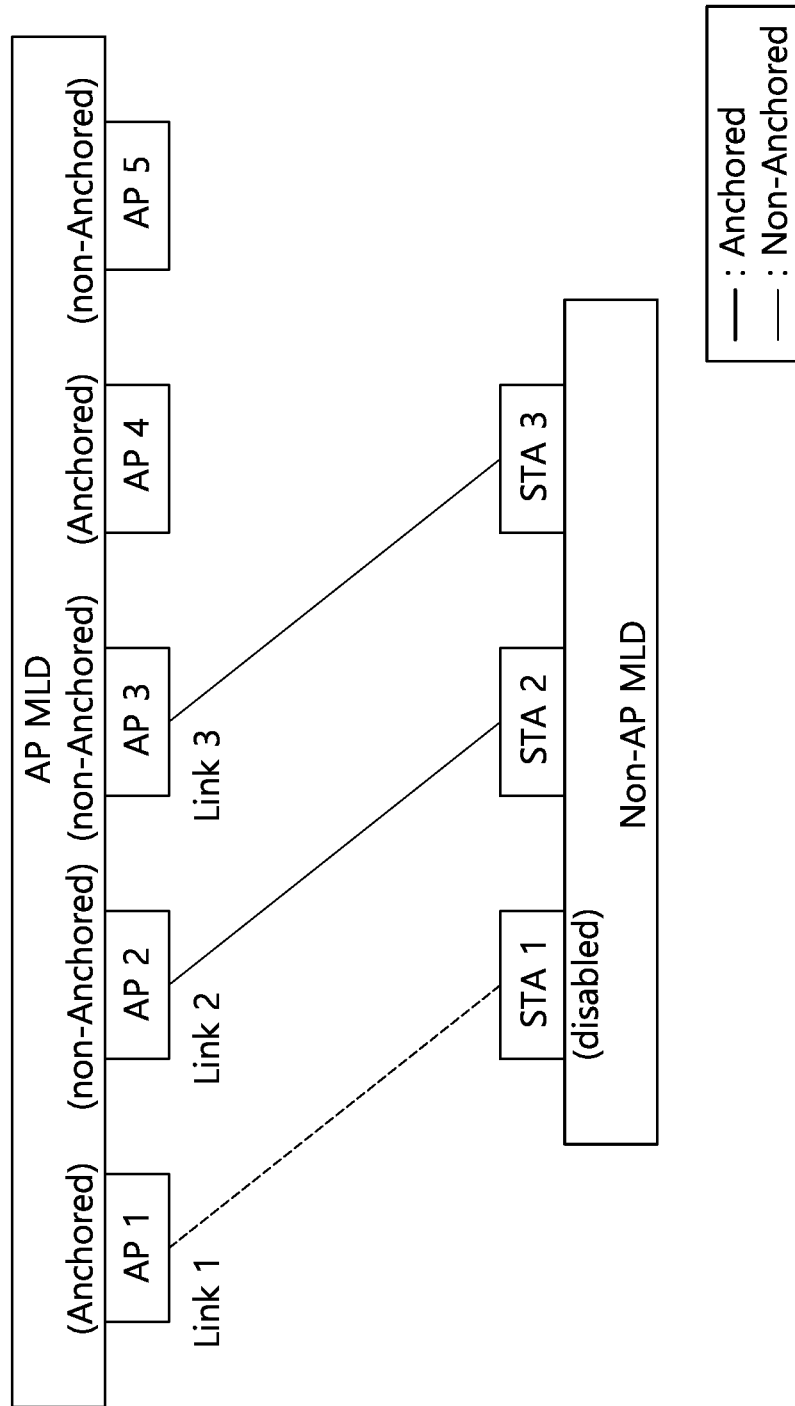
FIG. 28 illustrates an example of a situation in which an anchored link change or reconnection is required.

FIG. 28 illustrates an example of a situation in which an anchored link change or reconnection is required.

Referring to FIG. 28, the STA of the non-AP MLD may have a state of STA 1 disabled for various reasons (e.g., power-off). Here, since both STA 2 and STA 3 are currently connected to a non-anchored link, one of the STAs needs to be reconnected to an anchored link.

As shown in FIG. 28, when the non-AP MLD needs to reconnect to the anchored link, the non-AP MLD may attempt to reconnect one of STA 2 and STA 3 to the anchored link.

For example, when the non-AP MLD has information on the anchored link list supported by the AP MLD, the non-AP MLD may select a suitable link to request a link change.

In another example, when the non-AP MLD does not have the information on the anchored link list supported by the AP MLD, the non-AP MLD may obtain the information from the AP MLD through an info request, and may then select a suitable link to request a link change.

A specific example of operations of the AP MLD and the non-AP MLD according to the foregoing embodiment may be described with reference to FIG. 29.

Figure 29:
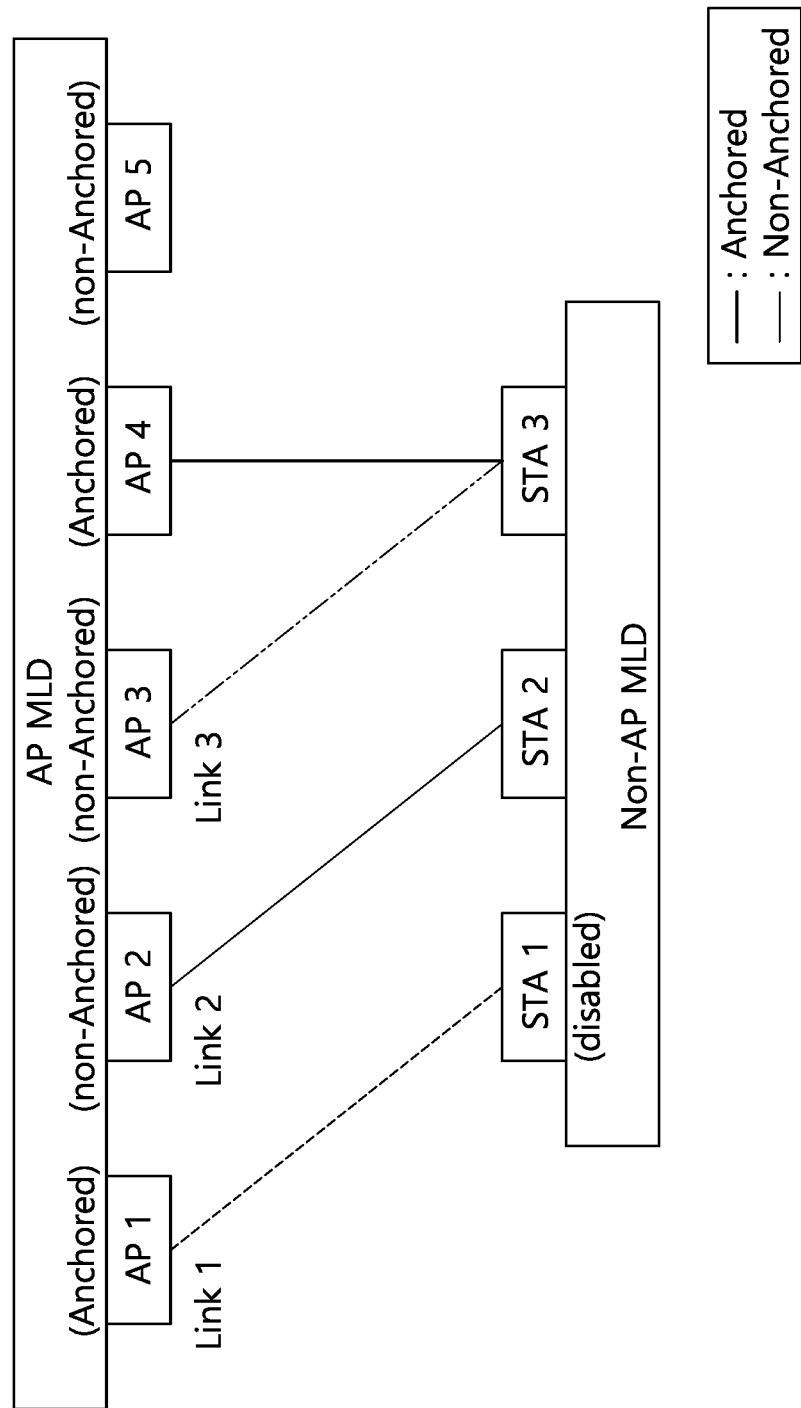
FIG. 29 illustrates the operations of an AP MLD and a non-AP MLD for an anchored link change or reconnection.

FIG. 29 illustrates the operations of the AP MLD and the non-AP MLD for an anchored link change or reconnection.

Referring to FIG. 29, when STA 1 connected to the anchored link is disabled, the non-AP MLD needs a new connection to the anchored link. Here, the non-AP MLD may disconnect STA 3 from the previously connected non-anchored link to AP 3, and may attempt to reconnect STA 3 to the anchored link.

For example, STA 3 may attempt to connect to AP 1 used as the existing anchored link. In another example, STA 3 may attempt to connect to new AP 4 based on various pieces of information.

A process of selecting a new anchored link may be performed in the same manner as/similarly to the foregoing embodiment for the link change or reconnection. For example, STA 3 may request a reconnection by selecting an anchored link recommended by the AP or directly selecting an anchored link by STA 3. After the reconnection to the anchored link is completed, the link of STA 3 may operate as an anchored link.

Element/Field Including Information on Anchored Link

According to an embodiment, when information on an anchored link supported by the AP MLD is changed or the STA directly requests information on an anchored link, the AP MLD may transmit the information (i.e., the changed information on the anchored link or the information on the anchored link requested by the STA) to the non-AP MLD.

For example, the information may be information related to an anchored link currently used, and may be included and transmitted in a beacon frame or may be included and transmitted in a separate management frame.

The information on the anchored link may include the foregoing "anchored link list" element indicating an anchored link supported by the AP MLD and information on whether an anchored link is used for each STA of the non-AP MLD.

Hereinafter, new elements including the information on the anchored link illustrated above may be proposed. Newly proposed elements may be configured/set as follows.

1) "Anchored link indication" element (or field): The "anchored link indication" element may include information on whether an anchored link is used for all STAs connected to the AP MLD. That is, the "anchored link indication" element may be an element/field indicating whether an anchored link is used for each link or each STA of the non-AP MLD.

2) "STA ratio per anchored link" element (or field): The "STA ratio per anchored link" element may include information on the ratio or number of STAs connected for each anchored link. Here, only a STA using a link as an anchored link may be considered. In other words, even though the AP MLD supports a first link as an anchored link, a STA using the first link as a non-anchored link may not be included in STAs connected for each anchored link.

According to an embodiment, the elements may be included as additional information in a frame, if necessary, in any process of the foregoing embodiment for the anchored link change or reconnection.

A specific example of the elements may be described with reference to FIG. 30 and FIG. 31.

Figure 30:
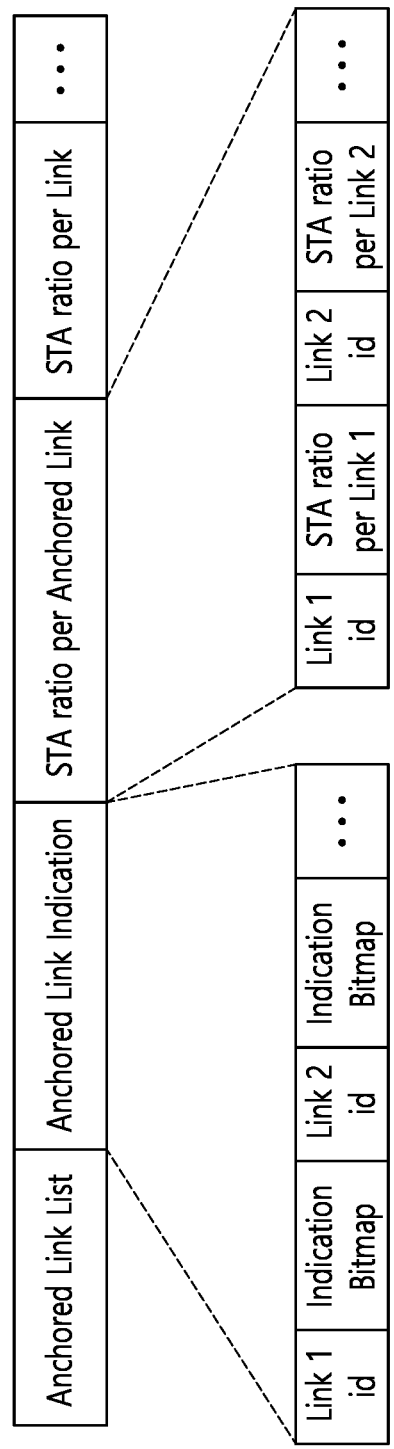
FIG. 30 and FIG. 31 illustrate specific examples of an element for an anchored link reconnection.
Figure 31:
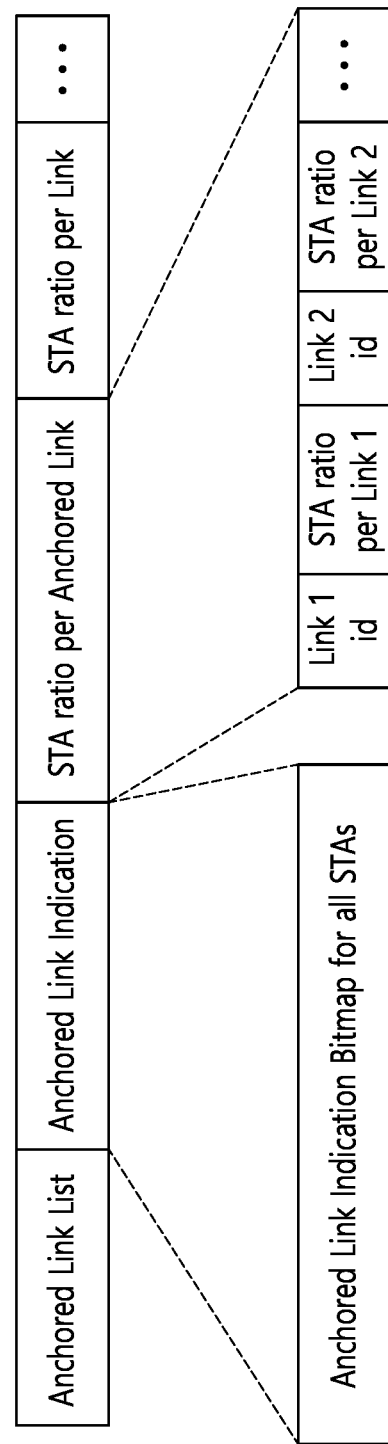

FIG. 30 and FIG. 31 illustrate specific examples of an element for an anchored link reconnection.

Referring to FIG. 30 and FIG. 31, information on an anchored link may be transmitted through an anchored link list element (or field), an anchored link indication element (or field), and/or a STA ratio per anchored link element (or field). In other words, an element for an anchored link reconnection may include the anchored link list element (or field), the anchored link indication element (or field), and/or the STA ratio per anchored link element (or field).

According to an embodiment, the anchored link list element may include information on a list of links currently supported by the AP MLD as described above. For example, lithe information on the list of links currently supported by AP MLD may be indicated based on a link ID or AP BSS information. In other words, the list of links currently supported by AP MLD may be configured/set based on the link ID or the AP BSS information.

According to an embodiment, the anchored link indication element may include information on whether an anchored link is used for each STA of the non-AP MLD. For example, the information on whether the anchored link is used for each STA of the non-AP MLD may be indicated/specified for each link through an indication bitmap. (i.e., FIG. 28). In another example, whether an anchored link is used for all STAs may be indicated/specified through one bitmap. (i.e., FIG. 29).

For example, when the information on whether the anchored link is used is indicated through an indication bitmap according to a link ID, the STA may identify a current anchored link based on the value of the anchored link list element. Accordingly, the STA may identify the ratio of STAs connected to each anchored link. Here, an indication bitmap field for a non-anchored link may be omitted to reduce overhead.

When the value of one bit in the bitmap is 1, the one bit may mean that a link currently connected to the STA is an anchored link. When the value of one bit in the bitmap is 0, the one bit may mean that the link currently connected to the STA is a non-anchored link. An embodiment of using a bitmap to indicate whether an anchored link is connected for each STA is for illustration, and information on whether the anchored link is connected for each STA may be transmitted through various embodiments.

According to an embodiment, the ratios of STAs for all links supported by the AP MLD may be transmitted. According to an embodiment, the STA ratio per anchored link element may include information on the ratio or number of STAs using each anchored link as an actual anchored link. For example, this information may be indicated only for an anchored link indicated/specified in the anchored link list element, thereby reducing overhead.

An example in which the value of the STA ratio per anchored link element is set may be described below.

For example, the AP MLD may include five APs (i.e., AP 1 to AP 5), and AP 1 may be connected to STAs through link 1. AP 2 may be connected to STAs through link 2. AP 3 may be connected to STAs through link 3. AP 4 may be connected to STAs through link 4. AP 5 may be connected to STAs through link 5.

The AP MLD may support two links among the five links (i.e., link 1 to link 5) as anchored links. Link 1 and link 4 may be supported/used as anchored links.

A total of 10 STAs are connected to link 1 (or AP 1), and seven STAs may use link 1 as an anchored link, which may be expressed/represented as 70% in ratio, and may be expressed/represented as 7 in value.

A total of 20 STAs are connected to link 4 (or AP 4), and five STAs may use link 4 as an anchored link, which may be expressed/represented as 25% in ratio, and may be expressed/represented as 5 in value.

The STA ratio per anchored link element may be transmitted together with the foregoing STA ratio per link element information, thus transmitting more accurate information to the STA. In general, since an anchored link may have more data traffic than a non-anchored link, the STA ratio per anchored link element may be used as useful information for a STA reselecting an anchored link.

The non-AP MLD may identify whether a link to which the non-AP MLD is connected is an anchored link, the ratio of STAs connected to each anchored link, and the ratio of STAs actually using an anchored link based on the foregoing pieces of information (or elements).

Additionally, when the AP MLD transmits information on other links, that is, all links, through the foregoing elements, the STA may identify the ratios of STAs connected to all anchors links of the AP MLD and the ratios of STAs actually using all anchored links based on one frame. Accordingly, the foregoing pieces of information (or elements) may be used when reselecting an anchored link to be used by the STA.

Therefore, according to the embodiment for the anchored link change or reselection, it is possible to change or reconnect to a more suitable anchored link by using not only various pieces of link information (e.g., the BSS load information for each AP or the STR capability information for each link) used in the embodiment for the link change or reselection but also the foregoing pieces of information on the anchored link (e.g., the anchored link list information, the information indication whether the anchored link is used for each STA, or the information on the ratio of STAs actually using each anchored link).

Figure 32:
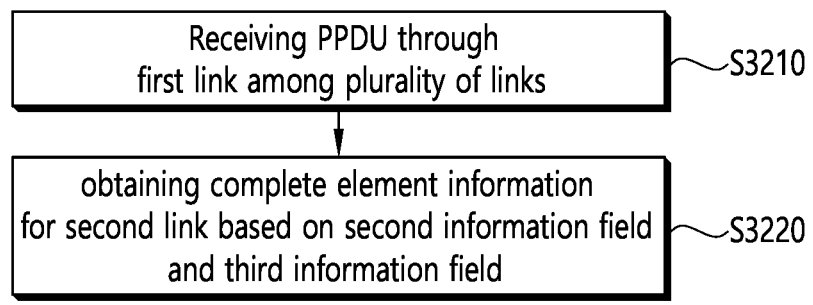
FIG. 32 is a flowchart illustrating the operation of a multi-link device.

FIG. 32 is a flowchart illustrating the operation of a multi-link device.

Referring to FIG. 32, in operation S3210, the multi-link device may receive a PPDU through a first link among a plurality of links. For example, the plurality of links may be included in 2.4 GHz, 5 GHz, and 6 GHz bands.

For example, the multi-link device may be connected to an AP multi-link device through a plurality of links including the first link and a second link. The multi-link device may include a plurality of STAs relating to the plurality of links. The multi-link device may include a first STA and a second STA.

For example, the first STA among the plurality of STAs may be connected to the first link. In other words, the first STA may operate in the first link. Further, the first STA may be connected to a first AP of the AP multi-link device through the first link.

For example, the second STA among the plurality of STAs may be connected to the second link. In other words, the second STA may operate in the second link. Further, the second STA may be connected to a second AP of the AP multi-link device through the second link.

According to an embodiment, the PPDU may include a first information field related to the second link that is distinct from the first link among the plurality of links. The first information field may include information on the second link.

For example, the first information field related to the second link may include a second information field related to a link identifier of the second link and a third information field related to whether complete element information for the second link is included in the PPDU.

The second information field may include four bits. The second information field may include link identifier (ID) information on the second link. The link identifier of the second link may be set to four bits. The second information field may include a link ID field.

The third information field may include one bit. The third information field may be set to a first value. For example, the multi-link device may identify that the complete element information for the second link is included in the PPDU based on the third information field being set to the first value (e.g., 1). In another example, the multi-link device may identify that partial element information on the second link is included in the PPDU based on that the third information field being set to a second value (e.g., 0). The third information field may include a complete profile field.

According to an embodiment, the complete element information for the second link may be configured based on the type of the PPDU. In other words, the complete element information included in the PPDU may be changed according to the type of the PPDU. For example, pieces of element information that may be included in a probe request frame may be set/defined. In another example, pieces of element information that may be included in an (re)association response frame may be set/defined. Accordingly, when the PPDU is a probe request frame, the multi-link device may identify whether all of the pieces of element information that may be included in the probe request frame are included in the PPDU based on the third information field.

According to an embodiment, the PPDU may further include a fourth information field related to a third link among the plurality of links. The fourth information field may include a fifth information field related to a link identifier of the third link and a sixth information field related to whether the complete element information for the third link is included in the PPDU.

According to an embodiment, the multi-link device may transmit a second PPDU for requesting the complete element information for the second link. The multi-link device may receive the PPDU including the first information field based on the second PPDU.

In operation S3220, the multi-link device may obtain the complete element information for the second link based on the second information field and the third information field.

According to an embodiment, the first link may operate as an anchored link. The second link may operate as a non-anchored link.

For example, the multi-link device may change a link operating as the anchored link from the first link to the second link based on the complete element information for the second link. In one example, the multi-link device may identify traffic load information on the second link. The multi-link device may transmit a frame (or PPDU) for changing the link serving as the anchored link from the first link to the second link based on the traffic load information on the second link.

Figure 33:
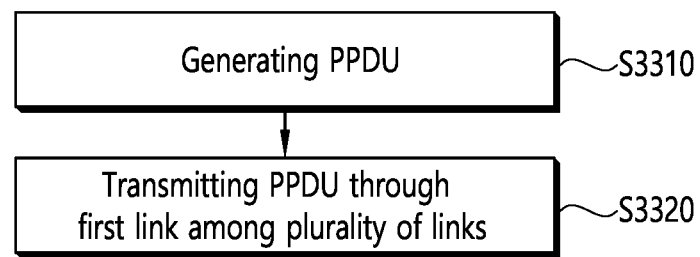
FIG. 33 is a flowchart illustrating the operation of an AP multi-link device.

FIG. 33 is a flowchart illustrating the operation of an AP multi-link device.

Referring to FIG. 33, in operation S3310, the AP multi-link device may generate a PPDU. For example, a plurality of links may be included in 2.4 GHz, 5 GHz, and 6 GHz bands.

For example, the AP multi-link device may be connected to a multi-link device through the plurality of links including a first link and a second link. The AP multi-link device may include a plurality of APs relating to the plurality of links. The AP multi-link device may include a first AP and a second AP.

For example, the first AP among the plurality of APs may be connected to the first link. In other words, the first AP may operate in the first link. Further, the first AP may be connected to a first STA of the multi-link device through the first link.

For example, the second AP among the plurality of APs may be connected to the second link. In other words, the second AP may operate in the second link. Further, the second AP may be connected to a second STA of the multi-link device through the second link.

According to an embodiment, the PPDU may include a first information field related to the second link that is distinct from the first link among the plurality of links. The first information field may include information on the second link.

For example, the first information field related to the second link may include a second information field related to a link identifier of the second link and a third information field related to whether complete element information for the second link is included in the PPDU.

The second information field may include four bits. The second information field may include link identifier (ID) information on the second link. The link identifier of the second link may be set to four bits. The second information field may include a link ID field.

The third information field may include one bit. The third information field may be set to a first value. For example, the AP multi-link device may set the third information field to the first value (e.g., 1) to indicate that the complete element information for the second link is included in the PPDU. In another example, the AP multi-link device may set the third information field to a second value (e.g., 0) to indicate that partial element information on the second link is included in the PPDU. The third information field may include a complete profile field.

According to an embodiment, the complete element information for the second link may be configured based on the type of the PPDU. In other words, the complete element information included in the PPDU may be changed according to the type of the PPDU. For example, pieces of element information that may be included in a probe request frame may be set/defined. In another example, pieces of element information that may be included in an (re)association response frame may be set/defined. Accordingly, when the PPDU is a probe request frame, the AP multi-link device may transmit the PPDU including the third information field indicating whether all of the pieces of element information that may be included in the probe request frame are included in the PPDU.

According to an embodiment, the PPDU may further include a fourth information field related to a third link among the plurality of links. The fourth information field may include a fifth information field related to a link identifier of the third link and a sixth information field related to whether the complete element information for the third link is included in the PPDU.

According to an embodiment, the AP multi-link device may receive a second PPDU for requesting the complete element information for the second link. The AP multi-link device may transmit the PPDU including the first information field based on the second PPDU.

In operation 3320, the AP multi-link device may transmit the PPDU through the first link among the plurality of links. For example, the first link may operate as an anchored link. The second link may operate as a non-anchored link. The AP multi-link device may transmit the PPDU including the information on the second link through the first link as the anchored link.

The foregoing technical features of the present specification may be applied to various devices and methods. For example, the foregoing technical features of the present specification may be performed/supported through the apparatus of FIG. 1 and/or FIG. 14. For example, the foregoing technical features of the present specification may be applied to only part of FIG. 1 and/or FIG. 14. For example, the foregoing technical features of the present specification may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 14. For example, an apparatus of the present specification may include a processor and a memory connected to the processor, wherein the processor may be configured to: generate a PPDU, the PPDU including a first information field related to a second link distinct from a first link among a plurality of links, and the first information field related to the second link including a second information field related to a link identifier of the second link and a third information field related to whether complete element information for the second link is included in the PPDU; and transmit the PPDU through the first link among the plurality of links.

The technical features of the present specification may be implemented based on a computer-readable medium (CRM). For example, the CRM proposed according to the present specification may be encoded with at least one computer program including instructions. When executed by at least one processor, the instructions may cause the at least one processor to perform operations including: receiving a physical layer protocol data unit (PPDU) through a first link among the plurality of links, the PPDU including a first information field related to a second link distinct from the first link among the plurality of links, and the first information field related to the second link including a second information field related to a link identifier of the second link and a third information field related to whether complete element information for the second link is included in the PPDU; and obtaining the complete element information for the second link based on the second information field and the third information field. The instructions stored in the CRM of the present specification may be executed by at least one processor. The least one processor related to the CRM of the present specification may be the processors 111 and 121 or the processing chips 114 and 124 of FIG. 1 or may be the processor 610 of FIG. 14. The CRM of the present specification may be the memories 112 and 122 of FIG. 1, may be the memory 620 of FIG. 14, or may be a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a multi-link device (MLD) operating in a plurality of links in a wireless local area network system, the method comprising:
   receiving a physical layer protocol data unit (PPDU) through a first link among the plurality of links,
   wherein the PPDU includes control information related to a second link distinct from the first link among the plurality of links, and
   wherein the control information related to the second link includes a first information field related to a link identifier of the second link and a second information field related to whether complete element information for the second link or partial element information for the second link is included in the PPDU, and the second information field has a length of one bit; and
   obtaining the complete element information for the second link based on the first information field and the second information field.

2. The method of claim 1, wherein the first information field comprises four bits.

3. The method of claim 1, wherein the second information field has a value of one for the complete element information, the second information field has a value of zero for the partial element information.

4. The method of claim 1, wherein the complete element information for the second link is set based on whether the PPDU is a probe request frame or a (re)association response frame.

5. The method of claim 1, wherein the first link operates as an anchored link, and the second link operates as a non-anchored link.

6. The method of claim 5, further comprising:
   changing a link operating as the anchored link from the first link to the second link based on the complete element information for the second link.

7. The method of claim 1, further comprising:
   transmitting a second PPDU for requesting the complete element information for the second link.

8. The method of claim 1, wherein the PPDU further comprises a third information field related to a third link among the plurality of links.

9. The method of claim 1, wherein the plurality of links is included in one of 2.4 GHz, 5 GHZ, and 6 GHz bands.

10. A method performed by an access point (AP) multi-link device operating in a plurality of links in a wireless local area network system, the method comprising:
generating a physical layer protocol data unit (PPDU),
wherein the PPDU includes control information related to a second link distinct from a first link among the plurality of links, and
wherein the control information related to the second link includes a first information field related to a link identifier of the second link and a second information field related to whether complete element information for the second link or partial element information for the second link is included in the PPDU, and the second information field has a length of one bit; and
transmitting the PPDU through the first link among the plurality of links.

11. A multi-link device (MLD) used in a wireless local area network system and operating in a plurality of links, the MLD comprising:
a transceiver to transmit and receive a radio signal; and
a processor connected to the transceiver,
wherein the processor is configured to:
receive a physical layer protocol data unit (PPDU) through a first link among the plurality of links,
wherein the PPDU includes control information related to a second link distinct from the first link among the plurality of links, and
wherein the control information related to the second link includes a first information field related to a link identifier of the second link and a second information field related to whether complete element information for the second link or partial element information for the second link is included in the PPDU, and the second information field has a length of one bit; and
obtain the complete element information for the second link based on the first information field and the second information field.

12. The MLD of claim 11, wherein the first information field comprises four bits.

13. The MLD of claim 11, wherein the second information field has a value of one for the complete element information, the second information field has a value of zero for the partial element information.

14. The MLD of claim 11, wherein the complete element information for the second link is set based on whether the PPDU is a probe request frame or a (re)association response frame.

15. The MLD of claim 11, wherein the first link operates as an anchored link, and the second link operates as a non-anchored link.

16. The MLD of claim 11, wherein the processor is further configured to transmit a second PPDU for requesting the complete element information for the second link.

17. An access point (AP) multi-link device (MLD) used in wireless local area network system and operating in a plurality of links, the AP MLD comprising:
a transceiver to transmit and receive a radio signal; and
a processor connected to the transceiver,
wherein the processor is configured to:
generate a physical layer protocol data unit (PPDU),
wherein the PPDU includes control information related to a second link distinct from a first link among the plurality of links, and
wherein the control information related to the second link includes a first information field related to a link identifier of the second link and a second information field related to whether complete element information for the second link or partial element information for the second link is included in the PPDU, and the second information field has a length of one bit; and
transmit the PPDU through the first link among the plurality of links.

\* \* \* \* \*